United States Patent [19]

Olig et al.

[11] Patent Number: 4,509,126
[45] Date of Patent: Apr. 2, 1985

[54] ADAPTIVE CONTROL FOR MACHINE TOOLS

[75] Inventors: Eugene A. Olig; Lee R. Ladwig, both of Fond du Lac, Wis.

[73] Assignee: AMCA International Corporation, Fond du Lac, Wis.

[21] Appl. No.: 386,481

[22] Filed: Jun. 9, 1982

[51] Int. Cl.³ .................... G06F 15/46; G05B 13/02
[52] U.S. Cl. .................................. 364/474; 318/561; 318/571; 364/148; 364/167; 364/475; 364/511
[58] Field of Search ................. 364/148, 167–171, 364/474, 475, 483, 511, 183, 157; 318/571, 650, 561, 565; 324/142; 408/8–13

[56] References Cited

U.S. PATENT DOCUMENTS

| | | | |
|---|---|---|---|
| 3,220,315 | 5/1964 | Mathias. | |
| 3,571,834 | 5/1971 | Mathias | 10/139 |
| 3,573,588 | 4/1971 | Geyer et al. | 318/571 |
| 3,581,045 | 5/1971 | Panschow | 219/69 |
| 3,589,077 | 6/1971 | Lenning | 51/165 |
| 3,656,124 | 4/1972 | McGee | 340/172.5 |
| 3,699,720 | 10/1972 | Lenning | 51/165.77 |
| 3,746,955 | 7/1973 | Kobayashi | 318/561 |
| 3,784,798 | 1/1974 | Beadle et al. | 235/155.11 |
| 3,840,791 | 10/1974 | Mack | 318/571 |
| 3,917,930 | 11/1975 | Davey et al. | 235/151.11 |
| 4,031,368 | 6/1977 | Colding | 364/475 X |
| 4,041,287 | 8/1977 | Kolell et al. | 235/151.11 |
| 4,054,780 | 11/1977 | Bartley et al. | 364/106 |
| 4,078,195 | 3/1978 | Mathias et al. | 318/561 |
| 4,096,436 | 6/1978 | Cook et al. | 324/142 |
| 4,193,227 | 3/1980 | Uhtenwoldt | 51/165.77 |
| 4,208,718 | 6/1980 | Chung | 364/474 |
| 4,228,782 | 10/1980 | Demers et al. | 125/14 |
| 4,237,408 | 12/1980 | Frecka | 318/571 |
| 4,245,316 | 1/1981 | Koikawa et al. | 364/474 |
| 4,266,375 | 5/1981 | Nishimura et al. | 318/571 X |
| 4,279,013 | 7/1981 | Cameron et al. | 364/105 |
| 4,330,832 | 5/1982 | Kohzai et al. | 364/474 |
| 4,351,029 | 9/1982 | Maxey et al. | 364/511 |
| 4,354,224 | 10/1982 | Sato | 364/183 |
| 4,408,280 | 10/1983 | Bedini et al. | 318/571 X |

OTHER PUBLICATIONS

Tool Sense Manual, §1, Valeron Corporation (documentation distributed with a machining power control system on sale by Valeron Co. more than one year before applicants' filing date) (corres. to Cameron Ref. AG supra).

Bendix Industrial Controls Division Brochure, "Adaptive Control", 12843 Greenfield Rd., Detroit, Mich. 48227.

Oren Masory & Yoram Koren, "Adaptive Control System for Turning," Paper No. 03116, *CIRP*, vol. 29 (1980).

J. N. Brecker and L. Y. Shum, "Tool Collision and Machine Considerations in Adaptive Control Systems", *Annals of the CIRP*, vol. 25 (1/1976), pp. 319–322.

*Primary Examiner*—Joseph F. Ruggiero
*Attorney, Agent, or Firm*—Leydig, Voit, Osann, Mayer & Holt, Ltd.

[57] ABSTRACT

An adaptive control for a turning machine which adjusts the machining rate to maintain the actual horsepower dissipated at the cutter tip at a constant set point despite changing workpiece and cutter parameters. The machining rate is adjusted by control of the machine drive and tool feed to achieve required SFM and IPR values, respectively, within maximum and minimum SFM and IPR limits. "Speed" and "Axis" override controls are also provided. The rate of adjustment of SFM and IPR to a deviation of the cutter tip horsepower from the set point is inversely proportional to the measured system gain so that the response factor of the control loop is maximized. The cutter tip horsepower is determined by subtracting the electrical loss, mechanical friction loss, and the net power required for net acceleration of the drive, from the measured electrical power supplied to the drive motor. The cutting efficiency is monitored to perform tool wear, tool breakage, and tool protection functions. The adaptive control also has soft engagement and soft disengagement functions for initiating and terminating the adaptive machining process.

45 Claims, 30 Drawing Figures

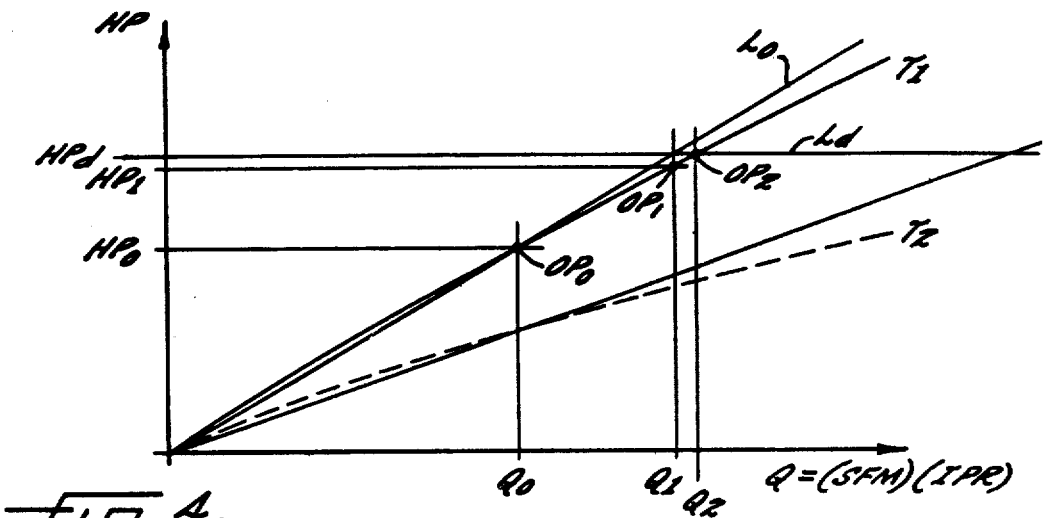
_fig. 4._
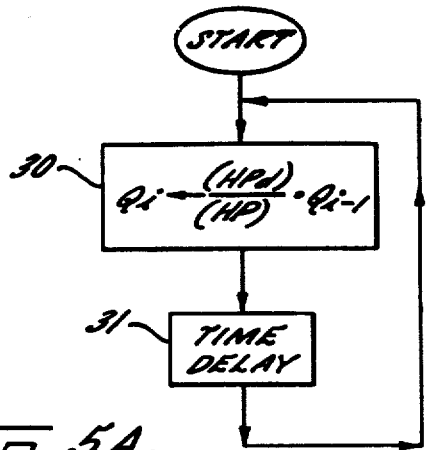
_fig. 5A._
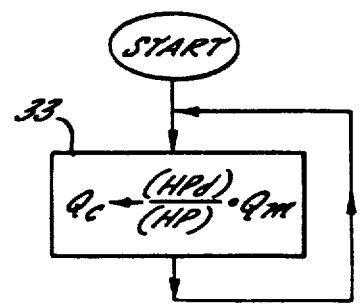
_fig. 5B._
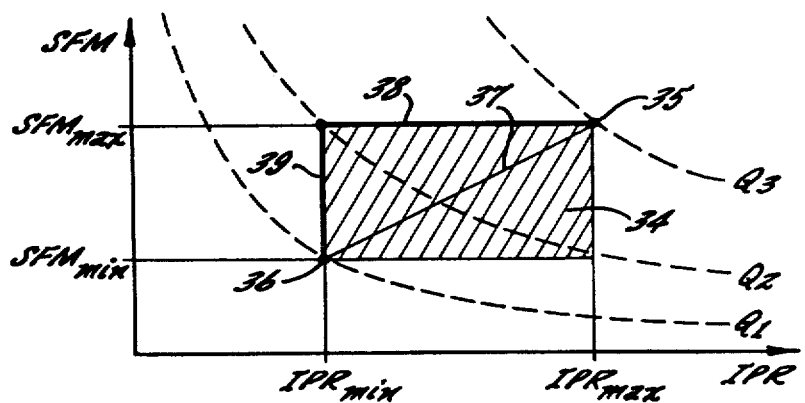
_fig. 6._

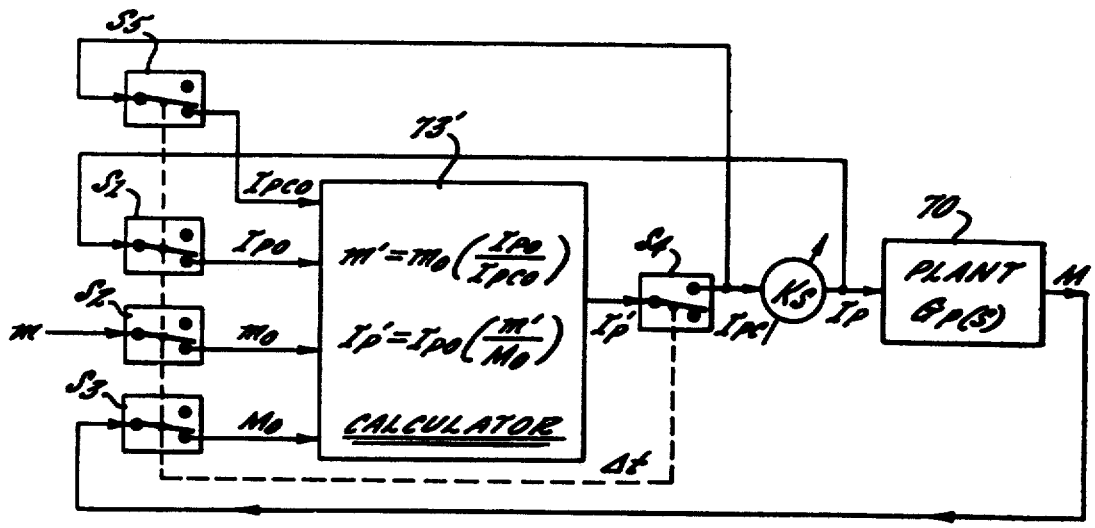
_Fig. 10D._
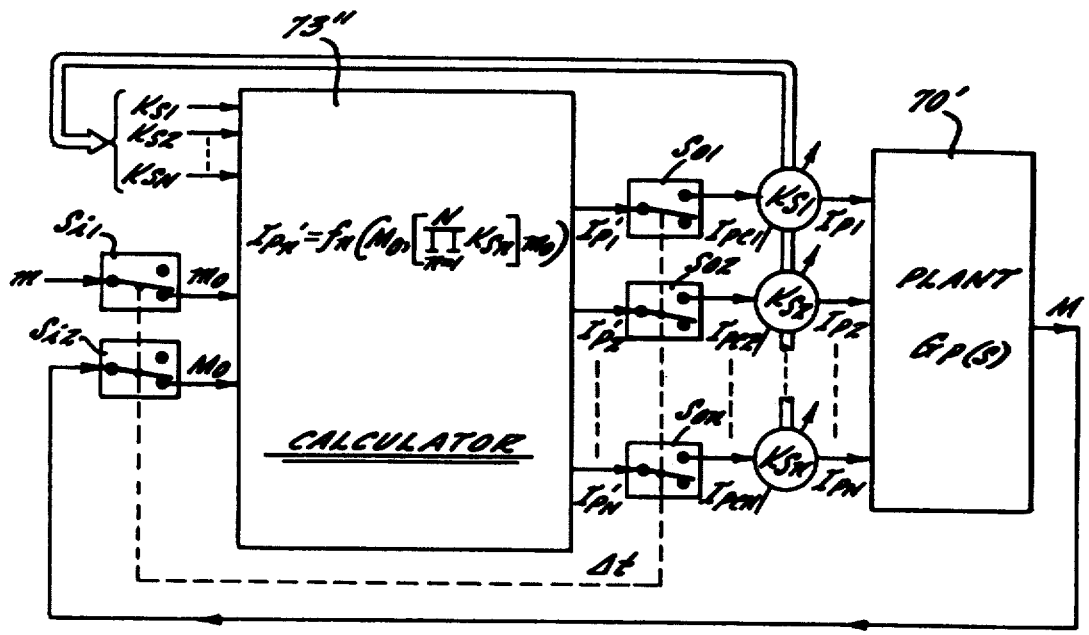
_Fig. 10E._

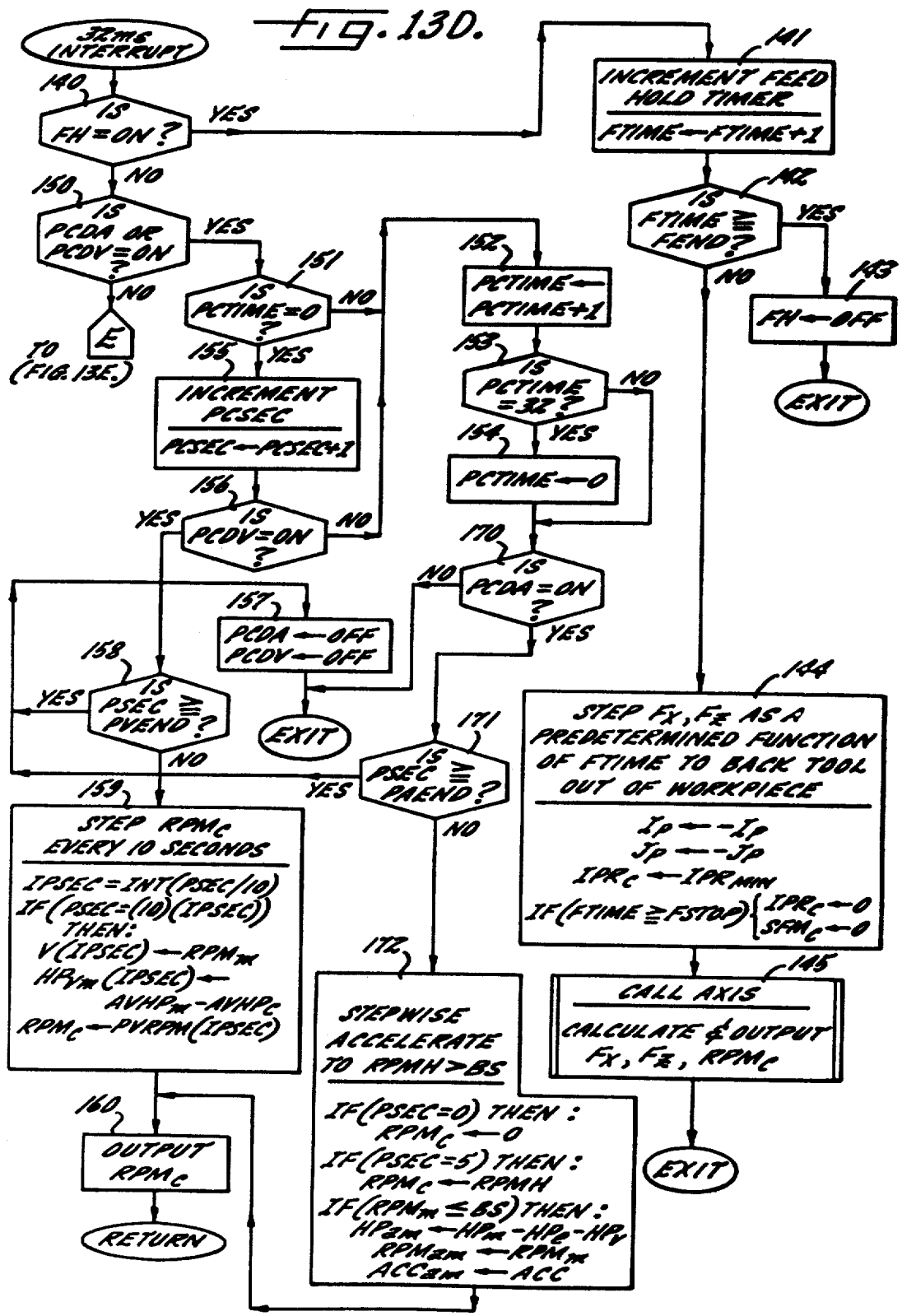

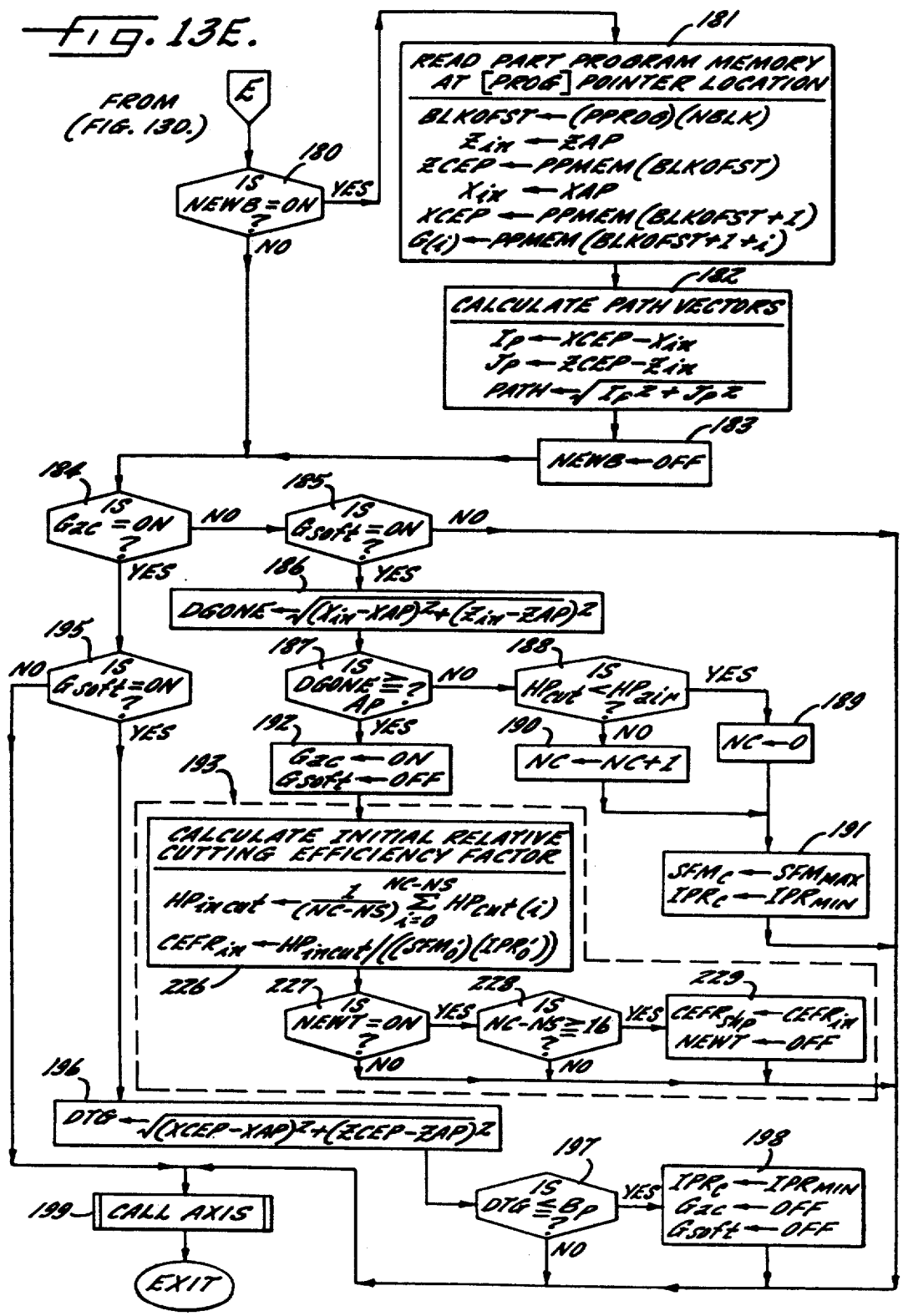

ADAPTIVE CONTROL FOR MACHINE TOOLS

BACKGROUND OF THE INVENTION

1. Field of the Invention

This invention relates to adaptive control in which the response of a feedback control automatically adjusts to gain variations in the controlled system. More particularly the invention pertains to turning machine tools such as horizontal and vertical lathes. Specifically, the invention relates to machine tools with an adaptive control, in which machining parameters such as workpiece surface velocity at the cutting edge of the tool and tool feed velocity are continuously adjusted during machining in response to measured machining parameters during the machining operation.

2. Description of the Prior Art (Prior Art Statement Under Rule 97)

It is well known in the art that machining time may be decreased by controlling machine tool drive and feed inputs to maintain certain machining parameters at maximal limits. One such limit is the workpiece surface velocity at the cutting edge of the cutter tool, measured in surface feet per minute and thus known in the art as SFM. Excessive SFM may burn the tool, and thus tool makers specify a maximum SFM for a given tool. Mack, U.S. Pat. No. 3,840,791 issued Oct. 8, 1974, for example, describes a system in a turning machine for accelerating a rotating workpiece as the cutter at first approaches the workpiece in order to obtain a maximal SFM at the beginning as well as throughout the machining operation. Another such limit is the power to the machine drive, measured in horsepower and known as HP. It is known that the maintenance of a maximal HP is desirable to minimize machining time, absent other limiting factors.

It is also known that there are certain ranges of machining parameters that constrain the selection of maximal SFM or HP. One such parameter is the tool feed velocity into the workpiece, measured in inches per revolution for turning machines and thus known as IPR. IPR is a measure of the depth of penetration of the tool into the workpiece and thus the width of the shavings or "chip thickness" of material cut from the workpiece. The maximum permissible force on the tool tip sets the maximum IPR, and exceeding this maximum might cause chatter, or tool breakage. On the other hand, if the IPR is below a certain minimum, depending on the tool geometry (especially its "chip breaker") and workpiece material, a large mass of thin, curled strips will be produced at the cutter and may clog the machine. Normally, the turning machine is operated at or above this minimum IPR so that the cutter breaks the shavings into small chips that fall away clearly and are easily removed from the machine.

There are many well known mathematical techniques, such as linear programming, for optimizing a function of several parameters, functionally related in a known way, within given constraint boundaries. For machining parameters, however, it is known that many of the functional relations between controllable and measured parameters change throughout the machining operation due to dulling of the cutter edge and changing geometry and surface condition of the workpiece. Thus, it is known in the prior art that the optimization procedure should adapt to the changing conditions of the machining parameters and the functional relations between them.

The prior art methods of adaptive control, such as that disclosed by B. Beadle et al. in U.S. Pat. No. 3,784,798, issued Jan. 8, 1974, assumes that the functional relations between measured parameters, controllable parameters, and the parameters sought to be optimized maintain certain general characteristics despite the fact that the functional relationships change. In particular, an increase in a measured parameter results from either an increase or decrease of controllable parameters, and an increase in the parameter to be optimized results from either an increase or decrease of the controllable parameters. Thus, optimization may proceed in a stepwise fashion of incrementally changing controllable parameters most likely to increase the parameter to be optimized, but changing controllable parameters in a different fashion most likely to avoid a constraint in measured parameters when a constraint boundry is passed. This method homes in on and iteratively checks for a desired operating point and may oscillate back and forth across constraint boundaries.

Grinding machines have been provided with controllable feeds activated in response to changes in current, power, or speed of the motor providing the transverse cutting velocity. W. Muller, Great Britain Pat. No. 782,432 issued Sept. 4, 1957 discloses an automatic grinding machine having a feed that is turned on and off in response to whether the grinding motor current or speed is less or greater, respectively, than a preset current or speed threshold. Muller also employs a rapid idle traverse to initially advance the grinding disc up to the workpiece, with contact detected by the resultant increase in motor current or drop in motor speed. R. Lenning, U.S. Pat. No. 3,589,007 issued June 29, 1971, discloses a grinding wheel with its feedrate controlled in response to the force exerted on the grinding wheel when it is in cutting engagement with the workpiece. The force is proportional to the power supplied to the grinding motor, and the difference between the measured force and a preselected reference force is used to energize the feed. When the workpiece is reduced to a predetermined size, the reference force is changed. It should be noted that none of these systems responsive to feed motor power determine the actual power delivered to the cutting interface, for example, by correcting for acceleration. Thus the response of these control systems must be limited to insure stability.

Cutting efficiency of rotary saws for slicing semiconductor wafers has been monitored to measure the condition of the edge of the saw. R. Demers, et al., U.S. Pat. No. 4,228,782 issued Oct. 31, 1980, discloses a system for controlling the blade-to-boule feedrate of a wafer cutting saw so that the blade-to-boule force, measured by a mechanical force transducer, is maintained generally constant. The measured blade-to-boule force is compared to a reference force and the error is applied to a feedrate control. During the cutting of the initial and final edges of the wafer the force selection is overridden by a maximum rate-of-feed limitation which is intended to prevent excessive shock and too rapid penetration during initial contact, which could otherwise damage the saw or chip the boule surface due to excessive pressure. The cutting efficiency of the saw is measured by the rate of feed, and the time required to cut a wafer is used as a criterion for determining when the saw blade needs to be dressed or replaced.

The measurement of the electrical power consumed by the drive motor of a turning machine has been used to sense tool breakage and to regulate tool feedrates. Commercial systems are available, for example, that decrease the feedrate if the drive motor power is above a preset maximum threshold, and increase the feedrate if the drive motor power is below a preset minimum threshold. The maximum threshold is set above the minimum threshold, defining a window over which the gain of the feedback control loop is set to zero in order to insure stability. The rate at which the feedrate changes, or response factor, is a predetermined constant, preferably set to the largest possible value which will allow stable operation of the machine. In such machines provisions are made for the user to select a number of high or low measured power limits and associated limit delays in order to control user defined machine functions enabled if the high or low limit is reached continuously for a time period longer than the associated limit delay. A low limit, for example, could be used to detect tool breakage. Moreover, a predetermined machine high power limit is usually provided as a protection feature to shut off the machine if the machine high power limit is exceeded for a time greater than a predetermined machine limit time delay. A somewhat shorter predetermined spindle surge time may be specified to disable the user selected limits when the machine high limit is exceeded, since temporary power surges are randomly encountered during normal machining and thus should be discounted when drive power is monitored to control user functions. An idle power predetermined maximum limit is typically provided along with a predetermined initial "air cut" feedrate and a preset transitional "impact" feedrate so that the tool is first brought into contact with the workpiece at a rapid "air cut" feedrate, and contact is detected by the increase in measured drive power above the idle power limit, whereupon the feedrate is switched to the impact feedrate and held for a predetermined impact hold time before the feedrate control loop is established. Moreover, a predetermined minimum feed limit is typically provided in terms of a percentage of a predetermined initial feedrate to set a floor below which the feedrate will not fall during normal operation of the machine. The combination of a high minimum feed limit and a low machine high power limit possibly could shut off the machine if a tool becomes dull, but at the expense of limiting the permitted operating ranges of workpiece and tool parameters. The use of a low machine high power limit, for example, is particularly ineffective in detecting tool dulling if feedback control reduces the machining rate to maintain a generally constant power in response to tool dulling.

SUMMARY OF THE INVENTION

An important aim of the invention is to maintain the machining power of a machine tool at a desired power level using a feedback control loop having a time-variant response factor that is adaptively adjusted to a maximal allowable value in response to changing machining parameters as the machining process progresses.

Another general aim of the invention is to continuously regulate machining power levels by varying a plurality of machine control inputs, and apportion the control input signals in a time-variant and optimal fashion in response to changing machining parameters as the machining process progresses. A related general aim is to provide an adaptive control compatible with user-adjustable override controls for adjusting the desired machining power by independently scaling individual machine control input signals, despite the general tendency of an adaptive control to compensate for gain variations in the response of the machine to individual control signals.

A specific objective of the present invention is to automatically adjust tool drive velocity and tool feed velocity to maintain a desired cutting horsepower level, regardless of changing depth and workpiece material properties, thereby allowing the programmer to use less conservative machining parameters.

Another object of the invention is to decrease machining time, since a constant maximal horsepower may be maintained and less conservative limits for machining parameters may be selected to maximize machining speed.

Yet another object is to provide a means of adaptively controlling a machine tool based on the horsepower actually consumed at the tool-workpiece interface, regardless of acceleration of the rotating workpiece or rotating cutting tool and power losses in the drive for rotating the workpiece or cutting tool. A related object is to provide an automatic means for calculating the system inertia, and other system losses, thereby making it possible to compensate for the drive losses and the acceleration of rotating workpieces or cutting tools of various sizes and shapes.

Still another object of the invention is to increase tool life by keeping machining parameters within feedrate constraints known to reduce wear and prevent tool breakage.

And yet another object is to provide a means for determining when a tool is becoming dull or breakage is imminent while simultaneously maintaining cutting power at a desired constant level. A specific object is to provide a means for detecting tool dulling to a predetermined or unacceptable degree, or imminent breakage by calculating and monitoring the relative or actual cutting efficiency of a tool in terms of power required for removal of a unit volume of workpiece material, substantially independent of cutting depth, cutting surface velocity, and feedrate.

Still another object is to provide a means for initiating contact of the tool with the workpiece and engaging an adaptive machining power control system and conversely disengaging the adaptive control system and completing the machining process in a controlled manner while minimizing stress overloads on the tool.

BRIEF DESCRIPTION OF THE DRAWINGS

FIG. 4 is a graph of the response of the cutting power in a machine tool to the "relative machining rate" at which the machine tool is driven.

FIG. 5A is a simplified flow diagram of the adaptive control procedure according to one aspect of the present invention.

FIG. 5B is an alternate simplied flow diagram of the adaptive control procedure wherein the delay step in FIG. 5A is implicitly provided by using the actual measured value of machining rate to iteratively calculate the commanded machining rate.

FIG. 6 is a graph of drive velocity in surface feet per minute versus feed velocity in inches per revolution showing the regions of permissible operation, the preferred operating points within the region of permissible operation, and the relative machining rate associated with the critical points of the region of preferred operation.

FIG. 10D is a block diagram corresponding to FIG. 10B with the addition of an override control for scaling the control signal in the control loop.

FIG. 10E is a block diagram illustrating a system corresponding to the block diagram of FIG. 10D but with the addition of a plurality of override controls.

FIG. 13A through FIG. 13H comprise a flowchart of a numerical procedure for execution in the numerical control unit of FIGS. 8 and 9 to adaptively control the vertical turret lathe shown in FIG. 7 as shown in the timing diagram of FIG. 12. Specifically, FIG. 13A is a flowchart of the executive program. FIG. 13B is a flowchart of the subroutine TEST used by the executive program of FIG. 13A to determine the next commanded values of SFM and IPR based on a comparison of the estimated desired machining rate to threshold levels. FIG. 13C shows subroutine PCD for determining the program constants of friction Ms and B, and the moment of inertia J. FIG. 13D shows the first part of the 32 mS interrupt procedure which performs the feedhold and initializing velocity control sequences. FIG. 13E shows the second part of the 32 mS interrupt procedure including the reading of the part program memory, calculation off path vectors, and the soft engagement and disengagement functions. FIG. 13F is a flowchart of the axis subroutine which generates the feed and drive control signals. FIG. 13G is a flowchart of the 64 mS interrupt which periodically calculates the actual cutting power at the cutter edge.

FIG. 13H is a flowchart of the tool monitor subroutine TLMNTR which calculates the relative cutting efficiency factor for detecting broken tools, tool wear, and tool protection conditions, and executing a feed hold when these improper conditions occur during machining.

Figure 1A:
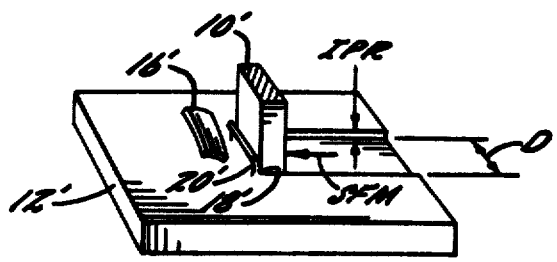
FIG. 1A, labeled prior art, is a perspective view of a generalized cutting tool engaged with a workpiece.

A glossary of selected terms has been appended before the claims for the convenience of the reader.

While the invention is susceptible to various modifications and alternative forms, a number of specific embodiments thereof have been shown by way of example in the drawings and will herein be described in detail. It should be understood, however, that they are not intended to limit the invention to the particular forms disclosed, but, on the contrary, the intention is to cover all modifications, equivalents, and alternatives falling within the spirit and scope of the invention as defined by the appended claims.

BEST MODE FOR CARRYING OUT THE INVENTION

I. Introduction to Machining Parameters

The exemplary embodiments of the invention herein described in detail generally concern the environment of a machine tool. In its most general form, as depicted in FIG. 1A, a machine tool employs a cutter tool 10' driven into a workpiece 12' so that chips of workpiece material 16' are cut from the workpiece by an edge 18' that cuts away workpiece material 20'. This is the basic mode of operation regardless of whether the machine tool is a lathe, a mill, a grinding machine, a drill, or the like.

Several parameters are illustrated in FIG. 1A that describe the machining process. One of the most important is the relative transverse velocity of the cutting tool edge 18' with respect to the workpiece 12' surface, which is conventionally measured in surface feet per minute and thus denoted as SFM. Another important machining parameter is the distance of the cutter edge below the surface of the workpiece in a direction normal to the workpiece surface and thus also normal to the direction of the velocity SFM. This distance is denoted IPR (also known in the art as "chip thickness") which has a special meaning for turning machines, as will be described below. A third important machining parameter is the depth of cut D in a direction parallel to the workpiece surface but normal to velocity SFM. Inspection of FIG. 1A reveals that the cross-sectional area A of the workpiece shaving 20' is the product of the distance IPR and the depth D. Since SFM is the velocity at which the shaving 20' appears to be emitted from the edge 18′ of the cutter 10′, the machining rate dC/dt, defined as the rate at which workpiece material is removed, is the product of SFM, IPR, and D. (In all equations, except otherwise noted, a rationalized system of units is assumed; for example, the factor of 12 to convert inches to feet as commonly used in industry is implicitly assumed.)

The exemplary embodiments of the present invention will be described specifically with respect to a turning machine such as a vertical turret lathe and the like as shown schematically in FIG. 1B. The cutter 10 engages a workpiece 12 which is mounted on a table 14 that is rotated by a drive 17. The cutter 10, for example a ceramic or tungsten carbide insert, is held in a tool holder 19 which is moved in a radial and an axial direction by a tool feed 20. The axial direction is conventionally denoted as the Z direction and the radial direction is conventionally denoted as the X direction so that the tool feed velocity may be resolved into components $F_x$ and $F_z$.

Figure 1B:
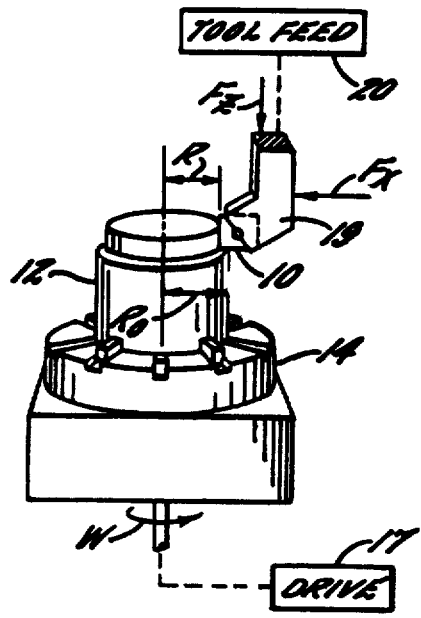
FIG. 1B, labeled prior art, is a perspective view of a schematic representation of a vertical turret lathe shown to illustrate the relation between the cutting tool and the workpiece.
Figure 1C:
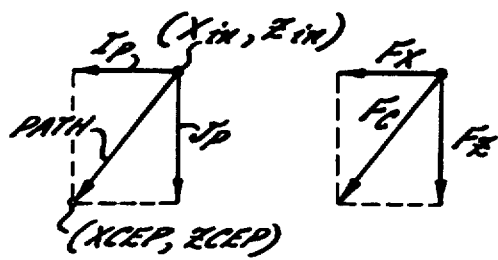
FIG. 1C, labeled prior art, shows the displacement vectors and feed velocity vectors representing the relative motion of the cutting tool being fed into the workpiece.

The relation between the tool feed velocity vectors and the displacement vectors of the cutting tool 10 are shown in detail in FIG. 1C. The resultant tool feed velocity is denoted as $F_c$. The feed velocity vectors $F_x$ and $F_z$ are geometrically similar to the displacement vectors Ip and Jp conventionally designating the X displacement component and the Z displacement component respectively. The resultant displacement vector is denoted as PATH which is a vector from an initial point ($X_{in}$, $Z_{in}$) to a terminal point (XCEP, ZCEP).

Figure 1D:
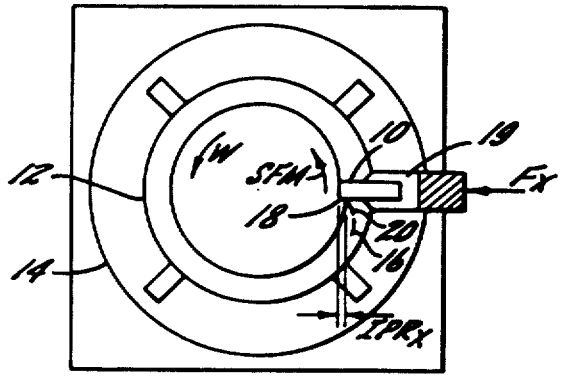
FIG. 1D, labeled prior art, is a top view of the vertical turret lathe schematic of FIG. 1B drawn to illustrate a facing operation.

The vertical turret lathe of FIG. 1B may be operated in one of two modes or a combination thereof. In a facing mode, the tool feed is advanced radially inward along the X axis into the workpiece, as shown in FIG. 1D, so that the velocity SFM is equal to the angular velocity w of the workpiece multiplied by the changing radius R of the cutter edge 18 from the central axis from the workpiece. Since the locus of the cutter edge with respect to the workpiece 12 traces out a spiral, the distance of the cutter edge into the surface of the workpiece is equal to the inward radial feed $F_x$ of the cutting tool into the workpiece divided by the rotational velocity RPM = w/2π. Conventionally the feedrate of the cutting tool is measured in inches per minute and the rotational velocity is measured in revolutions per minute so that the parameter IPR has dimensions inches per revolution, thus explaining the meaning of the mnemonic IPR. The distance IPR in FIG. 1D is in the x direction and thus in FIG. 1D IPR is given the subscript x. The depth of cut D is in the Z direction.

Figure 1E:
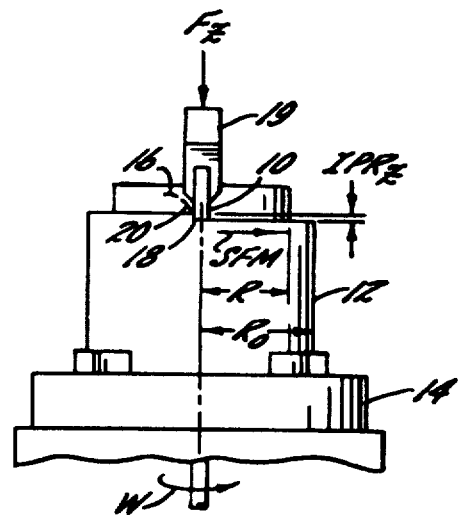
FIG. 1E is a side view of the vertical turret lathe schematic of FIG. 1B drawn to show a turning operation.

The other mode of operating a vertical turret lathe is shown in FIG. 1E. For a turning cut, the cutter is fed in the Z direction into the workpiece so that the locus of the cutter edge with respect to the workpiece is a helix. Thus the distance IPR is in the Z direction and the depth of cut D is in the X direction. It should be noted, however, that a rigorous definition of the velocity SFM is not readily apparent since SFM is not constant along the lower edge of the cutter 10 in contact with the workpiece in FIG. 1E. If the parameter D is defined as the width of the shaving or chip 16, then D is equal to the outer radius $R_o$ minus the inner radius R. Then it is possible to define an effective or average SFM so that the machining rate dC/dt is still equal to the product of D, SFM, and IPR. Noting that the amount of material removed in one revolution is equal to (IPR) (π) ($R_o^2 - R^2$), the effective SFM may be derived as:

$$\frac{dC}{dt} = (SFM_{eff})(IPR)(D) = (RPM)(IPR)(\pi)(R_o^2 - R^2) \quad (1\text{-}1)$$

But since $(R_o^2 - R^2) = (R_o + R)(R_o - R) = (R_o + R)(D)$ $$SFM_{eff} = (RPM)(\pi)(R_o + R) = (2)(\pi)(RPM)\frac{(R_o + R)}{2} \quad (1\text{-}2)$$

$$SFM_{eff} = w\frac{(R_o + R)}{2} = wR_{av} \quad (1\text{-}3)$$

Thus the effective SFM may be defined in terms of an average radius:

$$R_{av} = \frac{R_o + R}{2}$$

In general, the tool feed 20 will move the cutter 10 in an programmed path in both the X and Z directions, and the workpiece 12 will be cut by the rounded corner, or tip, at the edge 18 of the cutter 10 engaging the workpiece 12. In such a case the distance IPR may be defined as the magnitude of the resultant path velocity $F_c$ divided by the rotational velocity RPM of the workpiece. Also, without loss of generality, the velocity SFM may be defined as a product of the angular velocity w and the average radius $R_{av}$ being approximately the radial distance from the axis of the workpiece to the center of the area of contact of the workpiece with the cutter 10. The depth of cut D may be defined generally as the effective width of the shaving or chip 16 cut from the workpiece. "Chip thickness" remains in all cases essentially equal to IPR.

II. Cutter Tip Horsepower

The actual machining process occurs at the cutter tip 18 and the conditions at the cutter tip have a major effect on the machining process and the quality of the resultant machined article. Aside from the controllable parameters IPR, SFM, and D, uncontrollable parameters such as the hardness and density of the workpiece material and the sharpness, temperature, and physical intregrity of the cutter 10 may have primary influence on the quality of the machine article. The applicants have discovered that the actual horsepower expended at the cutter tip is a useful guide to these uncontrolled and uncontrollable parameters of the workpiece and cutter and that the actual horsepower at the cutter tip may be determined and used to regulate the machining process to improve the quality of the machined article without increasing machining time or shortening tool life. In accordance with an important aspect of the present invention, the applicants have discovered a method of determining the actual cutter tip horsepower from the horsepower consumed by the drive 17 by applying a number of corrections based on pre-determined constants which may be determined before the machining process or during an initial start-up procedure. In accordance with an exemplary embodiment, the drive 17 is an electric motor and the horsepower consumed by the drive is conveniently measured by a watt meter. Then the true power expended at the cutter tip $HP_{cut}$ is derived from the measured electrical power $HP_m$ by subtraction of the estimated (i.e., measured with precision or with some approximation) electrical resistive loss $HP_e$, mechanical friction loss $HP_v$, and the net power transferred to the inertial mass of the drive means and the rotating parts of the machine tool during net acceleration HPa according to:

$$HP_{cut} = HP_m - HP_c - HP_v - HP_a \quad (2\text{-}1)$$

Figure 2:
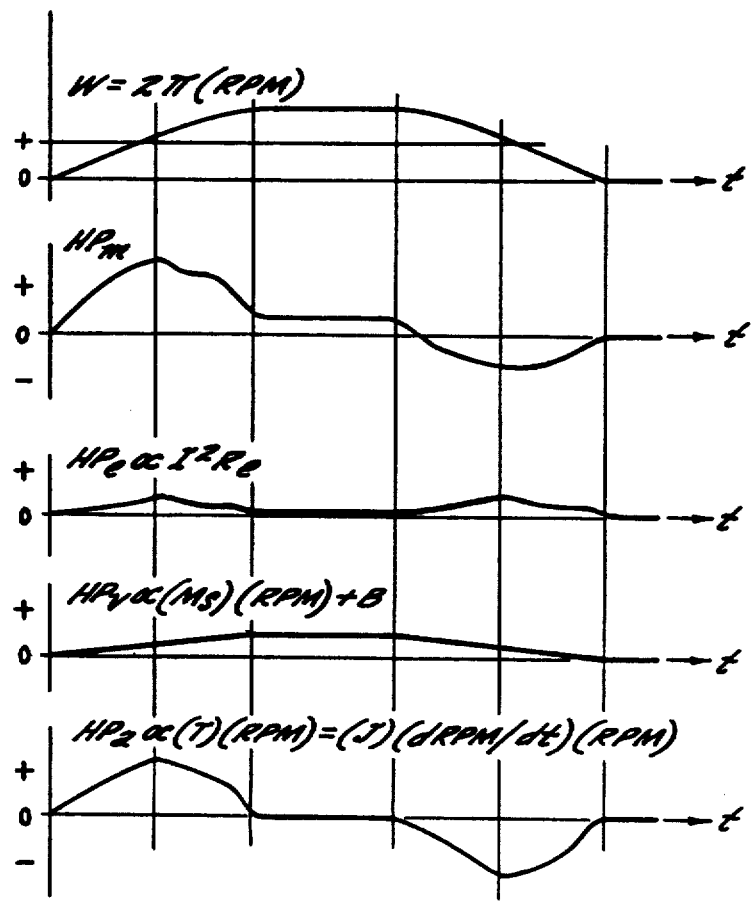
FIG. 2 is a graph of the time variation of the angular velocity of the workpiece, the measured power consumed by the drive, the electrical power consumed by the electrical resistance in an electrical motor drive, the power lost due to mechanical friction, and the net power transferred to the inertia mass of the drive and workpiece in a turning machine.

This equation is illustrated in FIG. 2, which shows that the various corrections $HP_c$, $HP_v$ and $HP_a$ add up to the measured power $HP_m$ when the cutting tool is disengaged so that $HP_{cut}$ is zero.

The electrical resistive loss or power consumed and dissipated as heat in the motor winding circuit of the drive motor, is proportional to the characteristic resistance $R_c$ of the motor windings and the square of the current I flowing through the drive motor:

$$HP_c = (I^2)(R_c)/(746) \quad (2\text{-}2)$$

where $HP_c$ is in units of horsepower, I is in units of amperes, and $R_c$ is in units of ohms. The units conversion factor of 746 is shown since it is universally recognized in the art. Although the resistance $R_c$ is somewhat dependent on temperature, satisfactory results are obtained by assuming that the resistance of the motor is constant. The resistance $R_c$ may be measured with an ohmmeter or may be supplied by the motor manufacturer. The drive motor current I may be continuously measured with an ammeter but for a DC drive motor satisfactory results may be obtained by measuring I indirectly from $HP_m$ and RPM.

If the voltage V across the motor windings is known, then the current I is related to measured horsepower $HP_m$ expressed in watts $W_m$ as:

$$W_m = (746)(HP_m) \quad (2\text{-}3)$$

according to:

$$I = W_m/V \quad (2\text{-}4)$$

By using this expression for the current, then the $I^2R$ loss of power, as heat, in the resistance of the motor circuit becomes:

$$HP_c = \frac{W_m^2}{V^2}(R_c)/(746) \quad (2\text{-}5)$$

But the voltage V need not be measured directly since for a DC motor V is approximately a linear function of RPM up to a known base speed BS at which V assumes a constant rated voltage Vop so that:

$$V = \frac{(RPM)(Vop)}{BS} \text{ if } RPM \leq BS \quad (2\text{-}6)$$

$$V = Vop \text{ if } RPM \geq BS$$

The base speed BS and rated voltage Vop are constants characteristic of a given type of motor and are usually stamped on the motor nameplate by the motor manufacturer.

Mechanical friction loss $HP_v$ is essentially proportional to the rotational velocity RPM of the drive 17. The friction loss predominates at a constant RPM. Satisfactory results are obtained by assuming that the total friction loss $HP_v$ is a linear function of a pre-determined coefficient of friction Ms and intercept constant B according to:

$$HP_v = (Ms)(RPM) + B \quad (2\text{-}7)$$

Ms and B are preferably determined for each workpiece by initially cycling the machine with the cutting tool disengaged up to several different constant RPMs. Then the frictional loss $HP_v$ at each constant RPM is determined by subtracting the electrical loss $HP_c$ from the measured horsepower $HP_m$. A standard least squares statistical procedure computes the constants Ms and B from the various data points of RPM and associated $HP_v$.

Variations in the measured power $HP_m$ due to acceleration are very significant and since they are not solely proportional to RPM, it is very important to correct the net power due to acceleration $HP_a$ whenever a feedback type control mechanism controls the machine tool in response to the measured power $HP_m$. Otherwise the feedback control loop may become unstable since the uncompensated $HP_m$ will contain a large differential component responsive to transients. The net power required for acceleration is proportional to the torque T and the rotational velocity RPM, but the torque T is itself proportional to a constant moment of inertia J and the time rate of change of the rotational velocity dRPM/dt according to the equations:

$$HP_a = \frac{(RPM)(T)}{63,000} \quad (2\text{-}8)$$

$$T = (J)(dRPM/dt) \quad (2\text{-}9)$$

$$HP_a = \frac{(J)(RPM)(dRPM/dt)}{63,000} \quad (2\text{-}10)$$

The units conversion factor of 63,000 is shown since it is well known in the art. For turning machines, the moment of inertia J is preferably determined for each workpiece since the moment of inertia in practice includes the inertial mass of the drive motor, the workpiece, and any other rotating components of the machine tool. Then the moment of inertia is determined, for example, by an initial procedure wherein the machine tool is accelerated and decelerated with the cutting tool disengaged. The net power $HP_a$ due to acceleration is calculated from the measured drive power $HP_m$ when RPM is changing:

$$HP_a = HP_m - HP_c - HP_v \quad (2\text{-}11)$$

Thus J is computed as:

$$J = \frac{HP_a(63,000)}{(RPM)(dRPM/dt)} \quad (2\text{-}12)$$

Figure 3A:
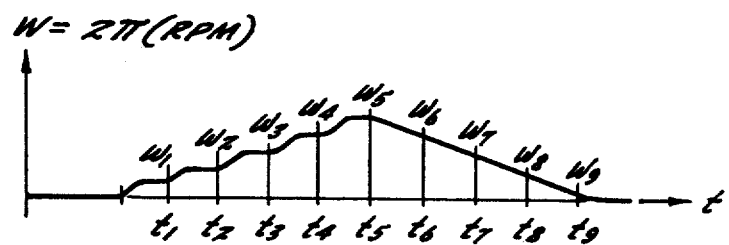
FIG. 3A is a graph of the time-varying angular velocity in a turning machine being stepwise accelerated and continuously decelerated for the calculation of constants of friction and moment of inertia, respectively.
Figure 3B:
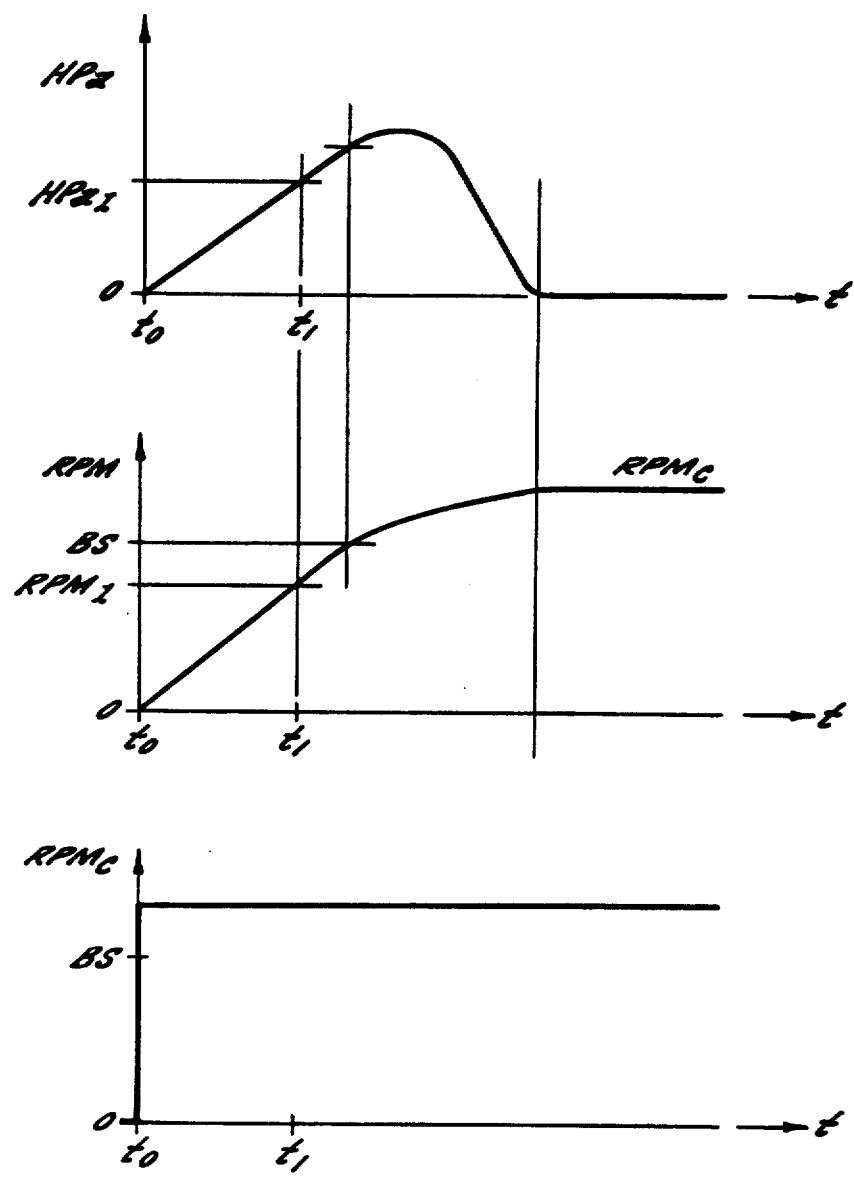
FIG. 3B is a graph of the horsepower due to acceleration, and the rotational velocity for a stepwise change in commanded drive velocity to a DC deive motor during the preferred procedure of accelerating the drive at a constant rate to determine the moment of inertia.

As shown in FIG. 3A, during an initial procedure the constants Ms and B estimating the frictional loss are determined during an initial stepwise acceleration of the drive and then the moment of inertia J is calculated during a continuous deceleration of the drive. Alternatively, for a DC drive motor, the moment of inertia J is quickly calculated during a subsequent acceleration by driving the DC motor with a large stepwise change in commanded drive velocity $RPM_c$, as shown in FIG. 3B. The DC drive motor responds automatically by continuously accelerating at a constant rate, at least so long as the rotational velocity RPM is less than the DC drive motor's base speed BS. This technique exploits the fact that a DC drive motor, as typically used in machine tools, has a constant maximum torque when operating below base speed BS.

Note that when the angular acceleration is constant, the time rate of change in the rotational velocity dRPM/dt is merely the time differential $(RPM_i - RPM_{i-1})/(t_i - t_{i-1})$. Thus, the moment of inertia J corresponding to the data in FIG. 3B is:

$$J = \frac{HP_a (t_1 - t_0)(63,000)}{(RPM_1)^2} \quad (2\text{-}13)$$

For the calculation and subsequent use of the moment of inertia J, the units conversion factor of 63,000 may be omitted if the factor is likewise omitted from the calculation of $HP_a$ according to equation (2-10). An exemplary numerical procedure for precisely carrying out these calculations and corrections to measured horsepower using a numerical control unit is discussed infra under subheading V, "Exemplary Embodiment of Adaptive Control Method for Controlling Cutter Tip Horsepower in a Turning Machine."

III. Adaptive Control of Machining Power

According to an important aspect of the present invention, an iterative adaptive control procedure is used to automatically control a relative machining rate control input Q in order to bring the machining power HP into conformance with a desired set point $HP_d$. In terms of the basic controllable machining parameters SFM and IPR, the relative machining rate Q is the product of SFM and IPR. As shown in FIG. 4, the functional relation between the independent variable Q and the dependent variable HP is both non-linear and time variant. The functional relations T1 and T2, for example, are measured at respective time intervals that are themselves widely spaced in time compared to the duration of the time intervals. Thus it is impossible to know in advance what value of commanded relative machining rate Q is needed to achieve a desired set point $HP_d$, due to the fact that there are other variables such as workpiece and cutter conditions that have a variable influence on the machining power HP.

The relative cutting efficiency CEFR as well as the relative machining rate Q are defined independently of the depth of cut D. The relative cutting efficiency CEFR is directly proportional to the actual cutting efficiency factor CEF if the depth of cut D is assumed to be constant. Similarly, the relative machining rate Q is directly proportional to the actual machining rate dC/dt if the depth of cut D is assumed to be constant. Consequently, the terms "relative cutting efficiency" and "relative machining rate" encompass the respective terms "actual cutting efficiency" and "actual machining rate". Any machining operation, for example, that is responsive to the actual cutting efficiency factor CEF necessarily is responsive to the relative cutting efficiency factor CEFR since the former is even more rigorous than the latter.

The applicants have discovered that the commanded relative machining rate Q required for a desired setpoint machining power $HP_d$ may be rapidly determined by an iterative procedure wherein the next value of commanded relative machining rate $Q_i$ is determined from the present value of relative machining rate $Q_{i-1}$ and the current measure value of machining power HP according to the iterative equation.

$$Q_i = (Q_{i-1})(HP_d)/(HP_{i-1}) \quad (3\text{-}1)$$

FIG. 4 illustrates graphically the solution to the iterative equation. Starting from a present value of relative machining rate $Q_0$, the present value of the machining power $HP_0$ is determined from the curve at T1 on the operating point $OP_0$. The iterative formula is equivalent to a linear extrapolation from the operating point $OP_0$ along a line $L_0$ through the origin to the horizontal set point line $L_d$. The intersection of line $L_0$ and $L_d$ has an abscissa that is the next value of relative machining rate $Q_1$. Repeating this graphical procedure, one finds that the next value of machining power is $HP_1$ and that at the end of the second iteration, a value of relative machining rate $Q_2$ is attained that is almost exactly the relative machining rate required for the set point $HP_d$. It should be noted, however, that even if the set point $HP_d$ is not changed, at some other time the functional relation T2 between the independent variable Q and the dependent variable HP may change from T1 to T2 (e.g., if the workpiece material becomes less hard) but the iterative procedure will automatically readjust the relative machining rate Q to achieve the set point $HP_d$.

In terms of a procedure in a numerical control unit, the simplified flowchart for the method is shown in FIG. 5A. The control loop consists of two main steps, a calculation step 30 which adjusts the value of the commanded relative machining rate Q by the ratio of the value of the set point $HP_d$ to the value of the machining power HP. The second major step of the procedure is a time delay 31. The time delay is inserted in order to insure stability by pre-selecting the delay time to be longer than the time delay during which it is certain that the machine tool will respond to the commanded relative machining rate. At the expense of additional means to measure the relative machining rate and thus determine a measured value $Q_m$, the delay time in 31 can be effectively set to the actual time delay of a machine tool in responding to a commanded change in relative machining rate, as shown in FIG. 5B. The procedure in FIG. 5B is equivalent to the procedure in FIG. 5A since if the delay time 31 is properly selected, the value of $Q_{i-1}$ in 30 will be equal to the measured valve $Q_m$ in step 33 of FIG. 5B. In other words, for the variable Q in step 30, there is no need to distinguish whether Q is a commanded or actual value. In step 33, however, the variable Q is given the subscripts c and m since if an explicit delay step 31 is not used, the measured value $Q_m$ must be distinguished from the commanded value $Q_c$.

The simplified iterative method illustrated in FIG. 4, FIG. 5A and FIG. 5B has a theoretical basis in terms of a machining parameter known as the cutting efficiency factor CEF. Despite variations in feed velocity $F_c$ and rotational drive velocity RPM, the amount of energy required to remove a unit volume of material denoted $CEF_v$, is fairly constant for a given cutting tool with a given degree of sharpness. Mathematically:

$$CEF_v = \frac{HP}{(SFM)(A)} = \frac{HP}{(SFM)(IPR)(D)} \quad (3\text{-}2)$$

Note that no system of units is specified in Equation (3-2). Thus for $CEF_v$ to be expressed in terms of absolute units such as killowatt-hours per cubic inch, the units of HP, SFM, IPR and D must be specified to determine a corresponding units conversion factor $K_f$. For $CEF_v$ in kilowatt-hours per cubic inch, HP in horsepower, SFM in feet per minute, and IPR and D in inches, the conversion factor is:

$$\frac{\text{kilowatt-hr}}{\text{in}^3} = (K_f) \frac{\text{horsepower}}{(\text{ft/min})(\text{in}^2)} \tag{3-3}$$

$$K_f = 0.746 \left(\frac{\text{kilowatt}}{\text{horsepower}}\right)\left(\frac{\text{hr}}{60 \text{ min}}\right)\left(\frac{\text{ft}}{12 \text{ in}}\right) = 0.00136 \tag{3-4}$$

Usually, it is assumed that the depth of cut D is generally constant and the units conversion factor is ignored so that a relative cutting efficiency factor CEFR may be defined as:

$$CEFR = \frac{HP}{(SFM)(IPR)} = \frac{HP}{Q} \tag{3-5}$$

Note that the efficiency or sharpness of a cutter decreases as CEFR *increases*, and thus CEFR is a numerical measure of the cutting inefficiency.

The problem of adaptive control of a turning machine involves the determination of control signals to adjust controllable machining parameters such as feed velocity $F_c$ and drive velocity RPM so as to obtain a desired machining power $HP_d$, despite changing machining parameters that cause the machining power HP to deviate from the set point machining power $HP_d$ and while keeping machining parameters such as IPR and SFM within specified limits or constraints. According to an important feature of the present invention, the required values of the controllable machining parameters are calculated assuming that the workpiece 12 material and cutter 10 related parameter CEFR at the time the measurable machining parameters are measured is the same as the parameter CEFR for the desired operation at the different machining power setpoint $HP_d$. In fact, there is some variation. The assumption results in rapid convergence of the measured machining power HP upon the desired machining power $HP_d$ since the relative variation in CEFR is only a minute fraction of the relative variation in the machining power HP. Mathematically, the parameter CEFR is calculated from sampled values $IPR_m$ and $SFM_m$:

$$IPR_m = \frac{F_c}{RPM_m} \tag{3-6}$$

$$SFM_m = 2\pi(R_m)(RPM) \tag{3-7}$$

$$CEFR = \frac{HP}{(SFM_m)(IPR_m)} = \frac{HP}{2\pi(F_c)(R_m)} \tag{3-8}$$

Then control values may be calculated that would achieve a desired power $HP_d$ if CEFR did not actually change:

$$Q = (IPR_c)(SFM_c) = \frac{HP_d}{CEFR} = \frac{(IPR_m)(SFM_m)(HP_d)}{HP} \tag{3-9}$$

Note that the equation gives a unique value for the relative machining rate Q so that the product of $IPR_c$ and $SFM_c$ is defined but further constraints must be imposed to determine specific values of $IPR_c$ and $SFM_c$. Some constraints are provided by the machining process itself, related to the workpiece material, the cutting tool composition, and the cutting tool geometry. A maximum IPR, $IPR_{max}$, for a given depth of cut D specifies a maximum cross-sectional area A of the workpiece material shavings 20 and thus the maximum force on the cutter tip 18. Exceeding $IPR_{max}$ may cause excessive chatter of the tool 10, preventing precise machining, and could cause excessive tool wear or breakage. A minimum IPR, $IPR_{min}$, should always be maintained so that the shavings 20 break into chips 16 rather than long strips, thus preventing a large mass of shavings from accumulating and clogging the machine tool. A maximum SFM, $SFM_{max}$ should not be exceeded since the friction at the cutter tip 18 results in a heating effect proportional to SFM, and excessive heating may burn the cutter tip and quickly dull the edge of the cutter. Thus cutter manufactures usually specify an $SFM_{max}$ for cutters of various compositions. A minimum SFM, $SFM_{min}$, may also be specified. If operation of the turning machine below some minimum point ($IPR_{min}$, $SFM_{min}$) is required so as not to exceed $HP_d$, then the cutter 10 is probably dull and should be replaced.

As shown in FIG. 6, the area bounded by the critical points ($IPR_{min}$, $SFM_{min}$) ($IPR_{max}$, $SFM_{min}$) ($IPR_{max}$, $SFM_{max}$), ($IPR_{min}$, $SFM_{max}$) represents a rectangle of permissible operation 34. Some functional relation, specified by a curve or path on the graph of FIG. 6, must be specified connecting the maximum product point ($IPR_{max}$, $SFM_{max}$) designated 35 with the minimum product point ($IPR_{min}$, $SFM_{min}$) designated 36. A linear segment 37, for example, could be chosen. But the inventors have discovered that in practice, it is desirable to minimize IPR at all times to reduce the force on the cutter tip 18 so as to minimize vibration. Thus, machining is chosen to operate on the top $SFM_{max}$ line 38, and if it is otherwise necessary to lower the relative machining rate Q, operation switches to the $IPR_{min}$ line 39. If the minimum product point 36 is reached, a "feed hold" is executed to terminate machining and reverse the direction of the tool feed velocity $F_c$ so that the cutter tool 10 is disengaged from the workpiece 12 and may be replaced with a sharp tool. Mathematically, the selection of $IPR_c$ and $SFM_c$ depends on the range in which the computed value of $Q=(IPR_c)(SFM_c)$ of Equation (3-9) falls:

If $Q \geq Q_3 = (IPR_{max})(SFM_{max})$ then set (3-10)

$SFM_c = SFM_{max}$ $IPR_c = IPR_{max}$

If $(IPR_{min})(SFM_{max}) = Q_2 \leq Q \leq Q_3 =$ (3-11)

$(IPR_{max})(SFM_{max})$ then set $SFM_c = SFM_{max}$ $$IPR_c = \frac{Q}{SFM_{max}} = \left[\frac{(IPR_m)(HP_d)}{(HP)}\right]\left[\frac{(SFM_m)}{(SFM_{max})}\right]$$

If $(IPR_{min})(SFM_{min}) = Q_1 \leq Q \leq Q_2 =$ (3-12)

$(IPR_{min})(SFM_{max})$ then set $$SFM_c = \frac{Q}{IPR_{min}} = \left[\frac{(SFM_m)(HP_d)}{(HP)}\right]\left[\frac{(IPR_m)}{(IPR_{min})}\right]$$

$IPR_c = IPR_{min}$

If $Q < Q_1 = (IPR_{min})(SFM_{min})$ then (3-13)

-continued
EXECUTE FEED HOLD

The machine controllable parameters then are determined from $IPR_c$ and $SFM_c$:

$$RPM_c = \frac{SFM_c}{2\pi R_m} \quad (3\text{-}14)$$

$$F_c = (IPR_c)(RPM_m) \quad (3\text{-}15)$$

Figure 7:
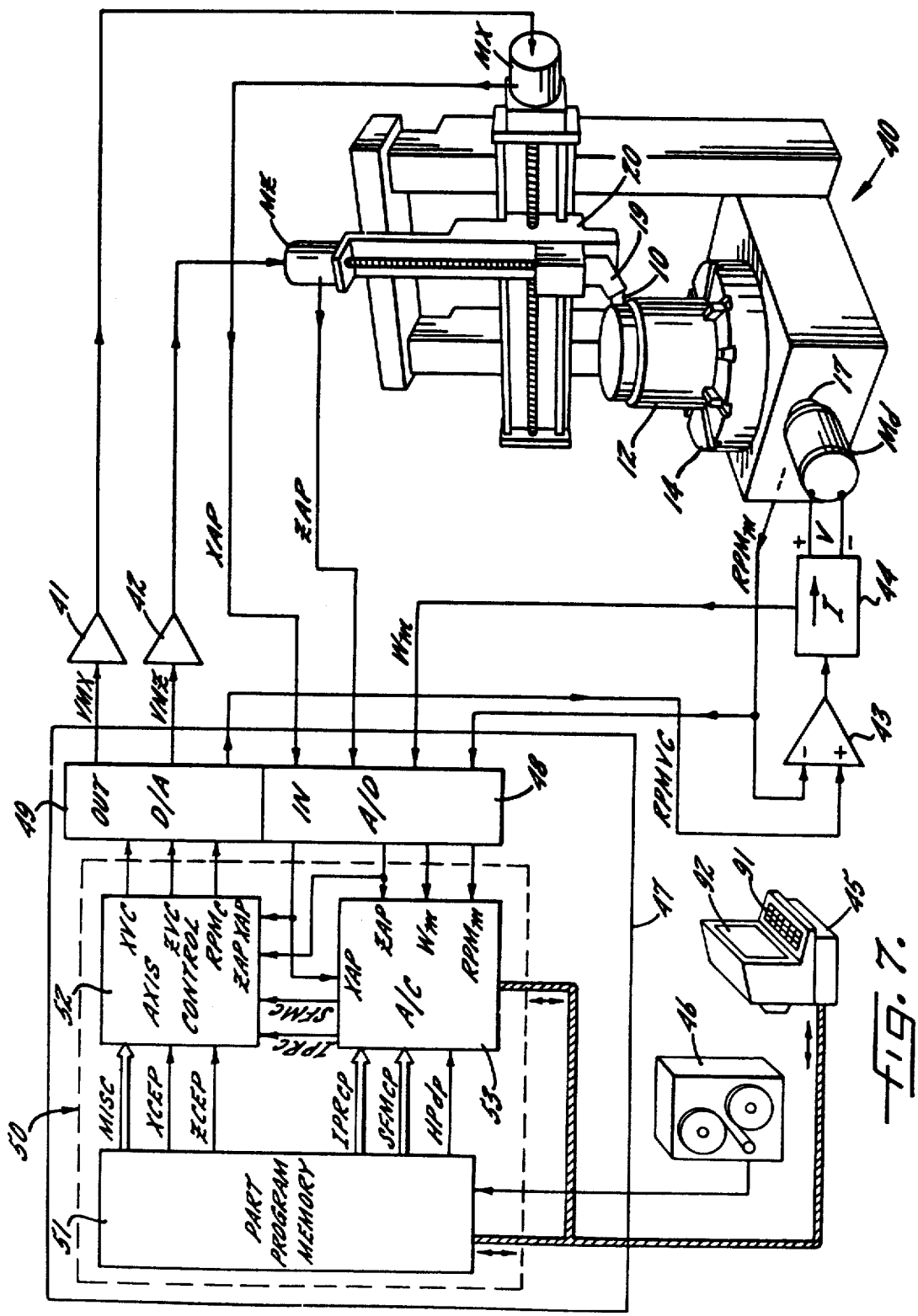
FIG. 7 is a pictorial and schematic diagram of an exemplary embodiment of the invention controlling a vertical turret lathe.

A schematic of an exemplary control system according to the control method of the present invention is shown in FIG. 7 driving a conventional vertical turret lathe generally designated 40. Operation of the lathe is performed by three motors; a drive motor $M_d$, an X direction tool feed motor $M_x$ and a Z direction tool feed motor $M_z$. These motors are driven by control signals RPMVC, VMX, and VMZ respectively. The feed motors $M_x$, $M_z$ are driven directly by servo drive amplifiers 41 and 42 respectively. The drive motor $M_d$ is controlled by a separate analog feedback loop which receives a drive tachometer signal RPMm for comparison to the control signal RPMVC using a differential drive amplifier 43 so that the drive control signal RPMVC commands a particular RPM value. As in conventional turret lathes, resolvers, Inductosyn devices, or pulse generators working into counters generate position indicating signals XAP, ZAP representing the actual position of the cutter tool, so that precise control of the velocity and position of the tool feed can be determined.

The components of the vertical turret lathe generally designated 40 described above are well known in the art. In accordance with an important aspect of the present invention, an electronic watt meter generally designated 44 senses the electrical power consumed by the drive motor $M_d$ and generates a power sensing signal $W_m$ which indicates measured drive power. A suitable electronic wattmeter is the OSI DC Watt Transducer model PC8-4-04 manufactured and sold by Okia Semitronics, 1205 Chesapeake Avenue, Columbus, Ohio 43212. Other components of the system in FIG. 7 have the same physical appearance as components well known in the art, such as an operator station terminal 45 having a keyboard 91 and cathode ray tube display 92, a part program tape drive 46, and a numerical control unit 47 having an input analog to digital (A/D) converter 48 and an output digital to analog (D/A) converter 49. The numerical control unit 47, however, is configured in a novel fashion by stored programming in a form schematically represented by the functional components generally designated 50. These functional components comprise a part program 51, an axis control unit 52, and an adaptive control unit 53.

In accordance with an important aspect of the present invention, the adaptive control unit 53 receives a set point $HP_{dp}$, and several control values $IPR_{cp}$, $SFM_{cp}$ comprising the maximum and minimum limits for IPR and SFM, and compares these programmed values to the actual cutter tip horsepower calculated from the watt meter signal $W_m$, the cutter position signals XAP and ZAP and the drive tachometer signal $RPM_m$, to generate command signals $IPR_c$ and $SFM_c$ in order to adaptively control the vertical turret lathe 40 so that the actual cutter tip power is maintained as closely as possible to the set point $HP_{dp}$. The axis control 52 receives the command signals $IPR_c$ and $SFM_c$ and also the position signals ZAP, XAP and generates machine control signals ZVC, XVC and $RPM_c$ that adjust the motor drive signals VMX, VMZ and RPMVC, so that the machine tool contours the workpiece according to a contour programmed in the part program memory 51 as X and Z coordinates XCEP, ZCEP. The axis control 52, however, also receives some miscellaneous MISC commands from the part program 51 in order to perform interpolation and some control functions peculiar to the adaptive control method of the present invention.

Figure 8:
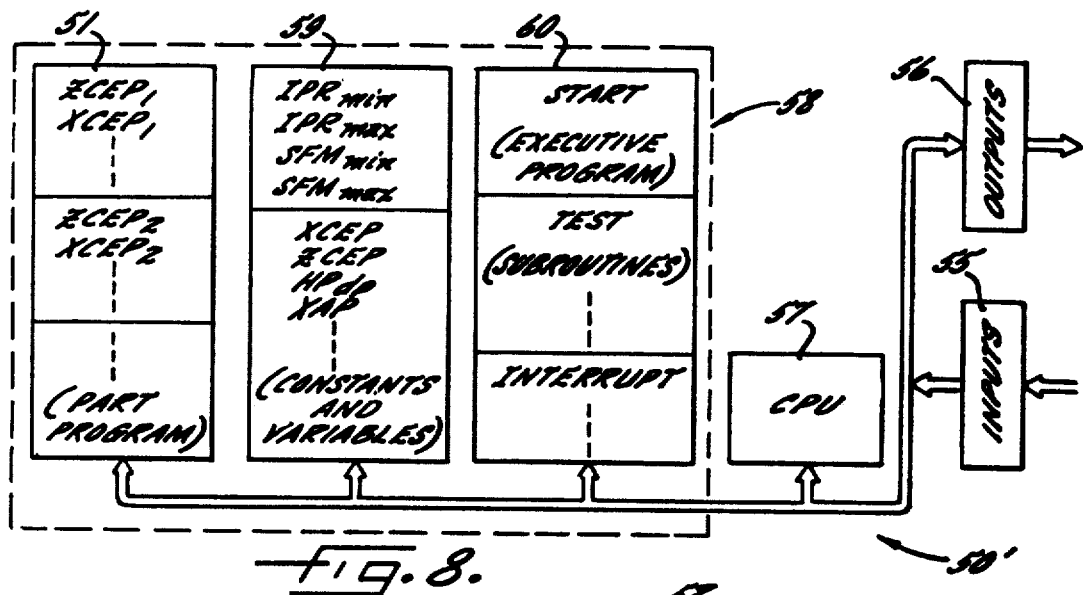
FIG. 8 is a schematic diagram of the hardware of the numerical control unit used in the exemplary embodiment of FIG. 7.

It should be noted that although the functions generally designated in the block 50 are schematically shown, the hardware for performing these functions has the general appearance of a numerical control unit generally designated 50' in FIG. 8. The numerical control unit has, for example, input registers 55, output registers 56, a central processing unit 57 which performs logical and algebraic functions, and a memory generally designated 58 for storing constants, variables, machine instructions and other data at predetermined addresses. In accordance with an exemplary embodiment of the present invention, the memory 58 is subdivided into three main parts; the part program memory 51, a working memory of constants and variables 59, and an adaptive control procedure memory 60 containing a sequence of instructions for execution by the central processing unit 57 in order to configure the numerical control unit 50' in the functional form generally designated 50.

The part program 51 is organized into a sequence of blocks, with each block being associated with the movement of the cutting tool between two pairs of X, Z coordinates. In each block a pair of target coordinates (XCEP, ZCEP) is stored. Also each block contains block constants describing how the numerical control unit 47 will function during the time that the cutter is moving to the target coordinates of a particular block from the last set of target coordinates. It should be noted that each time a new pair of target coordinates is read from the part program 51, the block constants, such as $IPR_{min}$, $IPR_{max}$, $SFM_{min}$, $SFM_{max}$ and the set point $HP_{dp}$ are also read and transferred with the target coordinates to the constant and variable storage 59. Although these block constants may change between blocks in the part program memory 51, they are essentially constant as far as the adaptive control procedure is concerned.

The general configuration of the adaptive control procedure follows the conventional configuration of an executive program, numerous subroutines called by the executive program, and a few interrupt routines which are automatically executed at periodic rates. The precise set and sequence of instructions in the adaptive control procedure, however, is highly detailed and in a sense arbitrary since an infinite variety of combinations of machine instructions can be executed by the CPU 57 to configure the numerical control unit 47 in the functional form generally designated 50 in FIG. 7. An exemplary embodiment of the instruction sequence is discussed infra in sub-heating V, "Exemplary Embodiment of Adaptive Control Method for Controlling Cutter Tip Horsepower in a Turning Machine."

Figure 9:
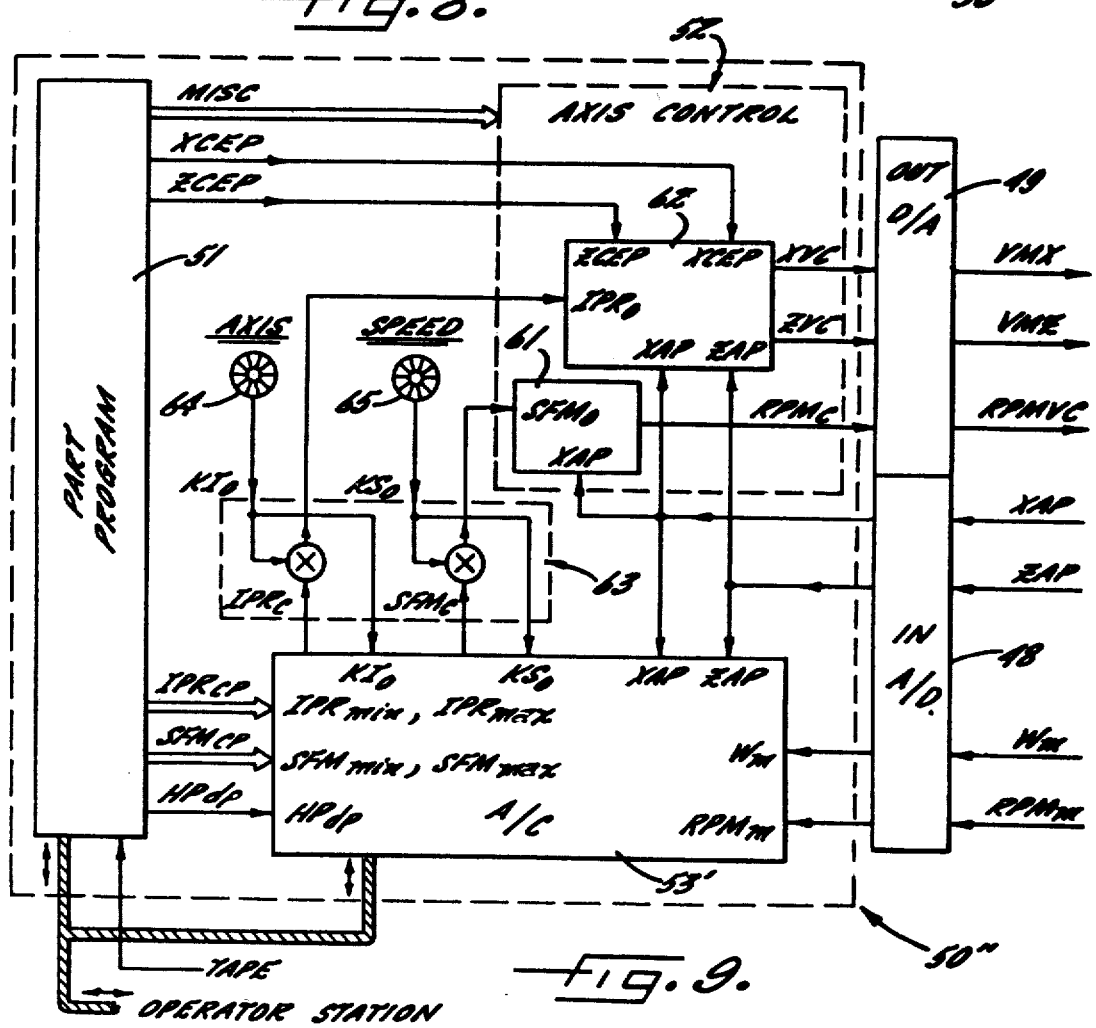
FIG. 9 illustrates the addition of override controls for scaling the feedrate and drive velocity command signals in the exemplary embodiment of FIG. 7.

The functions generally designated 50 in FIG. 7 may be expanded to include more detail and additional features as shown in FIG. 9. The AXIS control 52, in particular, has a functional block 61 for generating the rotational velocity control signal $RPM_c$ from an SFM control signal $SFM_o$ by essentially dividing the value of $SFM_o$ by the radius $R_m$ measured in terms of the actual X coordinate position XAP. The AXIS control 52 also has an interpolator 62 which generates the cutter feed control signals XVC and ZVC so that the desired cutter coordinates XAP, ZAP track the programmed cutter coordinates XCEP, ZCEP in a desired fashion and so that the cutter tool is driven at a resultant feed velocity $F_c$ set by the control signal $IPR_o$.

FIG. 9 also includes an override function 63 which receives a scale factor $KI_o$ from an "AXIS" control 64 and a scale factor $KS_o$ from a "SPEED" control 65 and scales the command signals $IPR_c$ and $SFM_c$ from the adaptive control unit 53' to generate the control inputs $IPR_o$, $SFM_o$ to the axis control 52 according to:

$$IPR_o = (IPR_c)(KI_o) \quad (3\text{-}16)$$

$$SFM_o = (SFM_c)(KS_o) \quad (3\text{-}17)$$

The AXIS control 64 and SPEED control 65 may be potentiometers, digital controls or thumbwheel switches for directly entering the values $KI_o$ and $KS_o$ or numeric values for $KI_o$, $KS_o$ may be keyed in from the operator station 45. In either case, the AXIS 64 and SPEED 65 controls correspond to override controls conventionally used to allow the machine operator to continuously vary the "SPEED" or SFM or the "AXIS" or IPR parameters to vary the machining rate Q. The controls 64 and 65 are typically calibrated in terms of a percentage factor to be applied to the programmed IPR and SFM.

In accordance with an important feature of the present invention, the adaptive control unit 53' receives the scale factors $KI_o$ and $KS_o$ as inputs so as to be compatible with user adjustable override control 64, 65 for continuous adjustment of the desired machining power by independently scaling the individual machine control input signals $IPR_o$, $SFM_o$, despite the general tendency of the simplified adaptive control unit 53 of FIG. 7 to compensate for gain variations in the response of the machine to the individual control signals $IPR_o$, $SFM_o$. By way of example, if the adaptive control unit 53 of FIG. 7 was used in place of the adaptive control unit 53' of FIG. 9, then if the operator reduced $IPR_o$ and $SFM_o$ by setting, for example, the AXIS and SPEED controls to 50% corresponding to a value of one-half for $KI_o$ and $KS_o$ then the AXIS control would initially reduce the feed velocity signals XVC, ZVC and RPMc by 50%, but the resulting reduction in machining power sensed from the corresponding reduction in the measured cutter tip horsepower would cause the adaptive control unit 53 to increase the control outputs $IPR_c$, $SFM_c$ until the AXIS control inputs $IPR_o$, $SFM_o$ were increased to their initial values before the AXIS 64 and SPEED 65 controls were reduced.

The applicant has discovered that this undesirable tendency of the adaptive control unit to cancel any change in the AXIS and SPEED control may be solved by feeding the scale factors $KI_o$ and $KS_o$ to the adaptive control unit 53' and using these scaling factors to adjust the comparison of the machining horsepower to the block constant set point $HP_{dp}$. The preferred method of interfacing the conventional AXIS 64 and SPEED 65 controls to the adaptive control unit 53', so that the adaptive control unit 53' maintains $IPR_c$ and $SFM_c$ constant when the scale factors $KI_o$ and $KS_o$ are changed, is for the set point $HP_d$ to be reduced by the factor $(KI_o)(KS_o)$ according to the relation:

$$HP_d = (KI_o)(KS_o)(HP_{dp}) \quad (3\text{-}17)$$

If the AXIS factor $KI_o$ is reduced from 100%, for example, when the adaptive control is operating in the constant SFM region 38 in FIG. 6, then $IPR_o$ is reduced by $KI_o$, the actual feed velocity $F_c$ is reduced by $KI_o$, the measured power $HP_m$ drops by about $KI_o$, but the desired power $HP_d$ as calculated in Equation (3-17) also drops by $KI_o$. Since the constant SFM control Equation (3-11) sets $IPR_c$ proportional to $HP_d/HP$, $IPR_c$ will not significantly change. In general, the control values $IPR_c$ and $SFM_c$ will not significantly change since the $(IPR_c)(SFM_c)$ product Q in Equation (3-9) is proportional to $HP_d/HP$.

IV. Generalized Adaptive Control Methods

Figure 10A:
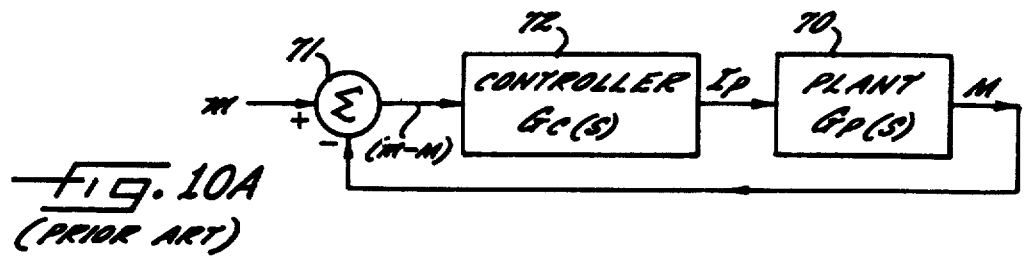
FIG. 10A, labeled prior art, is a block diagram of the conventional prior art control loop.

In light of the foregoing, it may be now understood that the invention is more broadly characterized than the exemplary embodiment of a control system for a machine tool. As shown in FIG. 10A, the conventional feedback control for a physical system 70, termed the "plant" in control theory, having a transfer function $G_{P(s)}$ arithmetically compares the system output M to a set point value m using a comparator 71 to arrive at a difference signal (m-M) which is processed by a control function $G_{C(s)}$ in a "controller" 72 to generate an input signal $I_p$. The system output M may be solved for in terms of the set point m according to:

$$G_{P(s)} = \frac{M_{(s)}}{I_{p(s)}} \quad (4\text{-}1)$$

$$I_{p(s)} = G_{C(s)}(m_{(s)} - M_{(s)}) \quad (4\text{-}2)$$

$$M_{(s)} = G_{C(s)} G_{P(s)} (m_{(s)} - M_{(s)}) \quad (4\text{-}3)$$

$$M_{(s)} = \frac{m_{(s)} G_{C(s)} G_{P(s)}}{1 + G_{C(s)} G_{P(s)}} \quad (4\text{-}4)$$

The subscript (s) denotes that all of the variables are frequency-dependent and may be analyzed in the Laplace domain. Thus Equation (4-4) shows that for the output M to track or follow the set point m, it is desirable for the magnitude of the control function $G_{C(s)}$ to be as large as possible so that the open loop gain, defined as $G_{C(s)} G_{P(s)}$ is large. But the magnitude of the control function cannot be made arbitrarily large because in practice there is a frequency-dependent phase shift in the plant transfer function $G_{P(s)}$ so that at some frequency, the open loop gain is $-1$ and the denominator in Equation (4-4) goes to zero, thereby signalling instability. In practice, the control function $G_{C(s)}$ may be made frequency dependent so as to counteract or compensate the phase shift in the plant transfer function $G_{P(s)}$. One typical method of selecting the control gain $G_{C(s)}$ to compensate an arbitrary plant transfer function is to use an integrator having a frequency dependency according to:

$$G_{C(s)} = \frac{k}{s} \quad (4\text{-}5)$$

Then the performance of the feedback control system may be simply but conveniently characterized by k, termed the "response factor," since k describes how fast the input $I_p$ responds to the error (m-M) according to:

$$\frac{dI_p}{dt} = k (m - M); sI_{p(s)} = K (m_{(s)} - M_{(s)}) \quad (4\text{-}6)$$

In practice, it is desirable to set the response factor k to as large a value as possible while simultaneously achieving stability.

A specific problem recognized by the applicants in the field of machine control is that if the machine tool is represented by a plant transfer function $G_{P(s)}$, the transfer function is time variant and in particular its magnitude even at very low frequencies is highly variable so that the optimum value for k in Equation (4-5) is also time variant. The applicants recognized that although this is true for machine tools, as exemplary embodiments of a control system particularly adapted to machine tools have been described supra, there are other time varient systems in which the control system according to the present invention is useful.

Figure 10B:
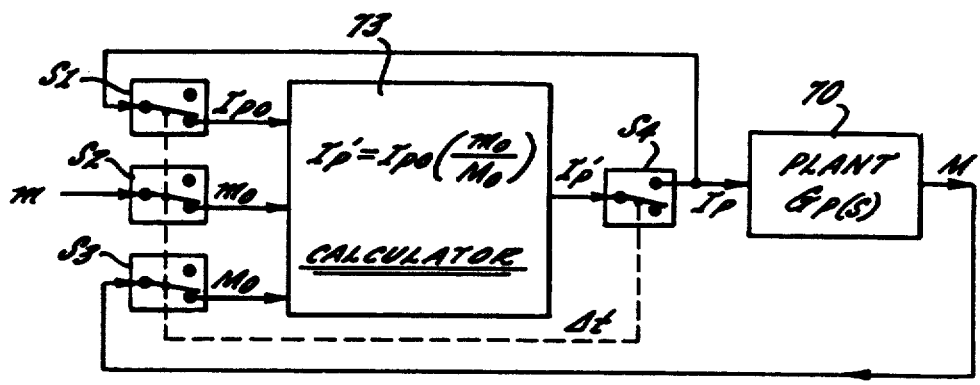
FIG. 10B is a generalized block diagram of one embodiment of the present invention as illustrated in broad functional terms.

As shown in FIG. 10B, the applicants' invention may be adapted to the arbitrary system, or plant 70 by the addition of a calculator 73 which performs a ratio type rather than a difference or error comparison. In other words, the applicants have discovered that an error signal may be conveniently generated by dividing the target value m by the output M rather than just by subtracting the output M from the target value m. Moreover, the control system according to the present invention is not limited to ratio type comparison means, but in fact may use either differencing or ratio type comparison means. Thus for the purposes of interpreting the claims, the applicant intends the term "comparison means" to embrace both ratio type and differencing comparison means. In FIG. 10B, the calculator 73 is interfaced to the plant 70 and setpoint or target m by samplers S1, S2, S3 and S4. The samplers provide a delay function so that the output of the calculator $I_p'$ is never fed back directly to the input $I_{po}$, and preferably the input samplers S1, S2, and S3 are periodically switched in opposite phase to the output sampler S4, the sampling period being denoted Δt. It will be recognized, however, that the combination of the calculator and the samplers is the conventional representation of a numerical control unit having input and output A/D and D/A converters such as the numerical control unit 47 having an input A/D converter 48 and output D/A converter 49 in FIG. 7.

Figure 10C:
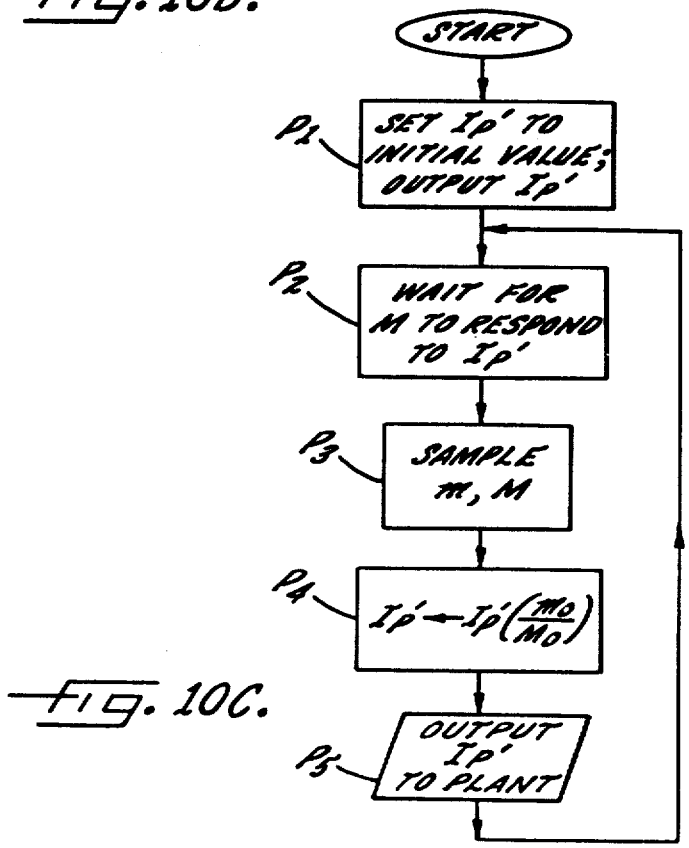
FIG. 10C is a flowchart of the numerical procedure for implementing the block diagram of FIG. 10B in a numerical control unit.

To perform the calculator 73 functions indicated in FIG. 10B, the procedure shown in FIG. 10C is executed by the numerical control unit. The first step P1 is for the numerical control unit to assume and output and initial value for the input $I_p'$. After waiting a delay time for the output M of the system 70 to respond to the input $I_p'$ as shown in step P2, the numerical control unit in step P3 samples the set point m and the system output M. In step P4, the numerical control unit adjusts its value of $I_p'$ by the ratio of the sampled value of the set point $m_o$ divided by the sampled value of the system output $M_o$. In step P5, this adjusted value is outputted to the system. The iterative loop is completed by returning to step P2 to wait for the system output M to respond to the input $I_p'$ before continuing.

To compare the iterative control system and procedure of FIGS. 10B and 10C with the prior art system of FIG. 10A and thereby demonstrate that the applicants' invention may be applied to conventional control systems, the algebraic comparison of the calculator equation of the numerical control unit equation in step P4 is mathematically converted to differential form which explicitly shows the equivalent arithmetic comparison:

$$I_p' = I_{po} \left( \frac{m_o}{M_o} \right) \quad (4\text{-}7)$$

$$I_p' - I_{po} = I_{po} \left( \frac{m_o}{M_o} - 1 \right) \quad (4\text{-}8)$$

$$I_p' - I_{po} = \frac{I_{po}}{M_o} (m_o - M_o) \quad (4\text{-}9)$$

$$I_p' - I_{po} \approx \Delta t \frac{dI_{po}}{dt} \quad (4\text{-}10)$$

$$\frac{dI_p}{dt} = \frac{1}{\Delta t} \left( \frac{I_{po}}{M_o} \right) (m_o - M_o) \quad (4\text{-}11)$$

$$k_a \approx \frac{1}{\Delta t} \left( \frac{I_{po}}{M_o} \right) = \frac{1}{\Delta t \, G_P} \quad (4\text{-}12)$$

Thus the embodiment of the invention shown in FIG. 10B is somewhat analogous to an integrator-type controller and the response factor $k_a$ for the adaptive control method is automatically set inversely proportional to the system gain $G_P \approx G_{P(s)}$ at s=0, in other words, the low frequency component of the plant transfer function. Somewhat surprisingly, the response factor $k_a$ is also inversely proportional to the sampling period Δt. This is in fact somewhat undesirable since one may want to make Δt as small as possible in order to have the value of the input $I_p$ to the plant change nearly continuously. On the other hand, the FIG. 10B embodiment in effect determines in a single, fast step the desired operating point for the plant.

In order to secure the advantages of the present invention while at the same time permitting small sampling periods, the calculator Equation (4-7) can be slightly modified to perform an interpolation or digital filtering function, for example, according to:

$$I_p'' = I_{po} \left( \frac{m_o}{M_o} \right) \quad (4\text{-}13)$$

$$I_p' = \frac{I_p'' + (N - 1) I_{po}}{N}$$

or equivalently:

$$I_p' = I_{po} \frac{\frac{m_o}{M_o} + N - 1}{N} \quad (4\text{-}14)$$

where N is a user-selected number of sampling periods required to effectively determine the operating point for the plant. Equations (4-13) and (4-14) can be converted to differential form to show that the response factor for interpolation or filtering is reduced inversely proportional to the product of Δt and N according to:

$$I_p' - I_{po} = I_{po} \left[ \frac{\frac{m_o}{M_o} - 1}{N} \right] \quad (4\text{-}15)$$

$$I_p' - I_{po} = \frac{1}{N}\left(\frac{I_{po}}{M_o}\right)(m_o - M_o) \quad (4\text{-}16)$$

$$\frac{dI_p}{dt} \approx \frac{1}{N\Delta t}\left(\frac{I_p}{M_o}\right)(m_o - M_o) \quad (4\text{-}17)$$

$$k_{an} = \frac{1}{N\Delta t}\left(\frac{I_p}{M_o}\right) = \frac{1}{N\Delta t\, G_p} \quad (4\text{-}18)$$

Thus it can be seen that the response factor $k_{an}$ can be made arbitrarily small by making N arbitrarily large. In practice, other known methods of interpolation and digital filtering may be used, as is illustrated and described below in conjunction with the subroutine FILTER of FIG. 13F, generally designated 210.

It should be noted that the numerical control step P4 of FIG. 10C may be put into differential form, thereby making the arithmetic comparison explicit according to:

$$I_p' \leftarrow I_p' + \frac{I_p'}{M_o}(m_o - M_o) \quad (4\text{-}19)$$

For interpolation, the step P4 in the numerical procedure is:

$$I_p'' \leftarrow I_p' \frac{m_o}{M_o} \quad (4\text{-}20)$$

$$I_p' \leftarrow \frac{I_p'' + (N-1)I_p'}{N}$$

or equivalently in terms of a single step according to:

$$I_p' \leftarrow I_p' + \frac{1}{N}\left(\frac{I_p'}{M_o}\right)(m_o - M_o) \quad (4\text{-}21)$$

Summarizing Equations (4-1) to (4-21), it has been shown that the proportional control of Equation (4-7) is substantially similar to a feedback control, as shown in FIG. 10A, with a controller 72 that has an integrator with a time-variant integration factor $k_a$, which was, in the specific example shown (wherein the plant transfer function $G_{P(s)}$ was assumed generally independent of frequency in Equation (4-12) also the response factor of the control loop.

It should be noted, however, that in general the control Equation (4-5) may contain derivative and proportional terms as well as integral terms, since the general aim typically sought by the circuit designer is to equalize phase shifts in $G_{P(s)}$ by selecting offsetting phase shifts in $G_{C(s)}$ to result in a net response $G_{C(s)}G_{P(s)}$ that is characteristic of an integrator above some maximally-high frequency. If $G_{P(s)}$ has, for example, the response characteristic of an integrator, then $G_{C(s)}$ may typically have a predominate proportional term $K_p$ such that $G_{C(s)} = K_p$.

According to the most general aspect of the present invention, a control function $G_{C(s)}$ is implemented as a digital filter and the input or output of the digital filter is adjusted inversely with respect to the measured system gain $(M/I_p)$, for example using the factor $(I_p'/M_o)$, so that the response factor of the control loop (most generally defined as the gain-bandwidth product of the control gain $G_{C(o)}$ and the maximally-high cuttoff frequency of $G_{C(s)}G_{P(s)}$, and thus measuring the rate at which an effective change in the control input $I_p'$ results from an offset of the output M from the setpoint m) is maximized while maintaining stability by generally equalizing loop gain. For a proportional control function $G_{C(s)} = K_p$, then the iterative control procedure step P4 of FIG. 10C becomes:

$$I_p' \leftarrow K_p\left(\frac{I_p'}{M_o}\right)(m_o - M_o) \quad (4\text{-}21')$$

For combinations of proportional and integral terms or proportional, integral, and derivative terms, then the digital filter must contain differential terms comparing past or delayed values of $m_o$ and $M_o$ to present values of $m_o$ and $M_o$. Denoting the most recent past values as $m_o'$ and $M_o'$, respectively, then the iterative control step P4 containing both a proportional and an integral term is:

$$I_p' \leftarrow I_p' + \left(\frac{I_p'}{M_o}\right)(m_o - M_o) + \quad (4\text{-}21'')$$

$$K_p\left(\frac{I_p'}{M_o}\right)[(m_o - M_o) - (m_o' - M_o')]$$

Similarly, derivative terms in the control function require higher-order differentials in the iterative control step.

The override feature of FIG. 9 may be generalized as shown in FIG. 10D which further shows the calculator determining the value of the scale factor $k_s$ as the ratio of $I_{po}$ to $I_{pco}$ in the calculator 73. To generalize the use of the override feature for any kind of calculator control function $f_n$, FIG. 10E mathematically asserts that the set point argument of the control function $f_n$ is scaled by the product $$\prod_{n=1}^{N} ks_n$$

of all of the scale factors. This is a sufficient condition to insure that a change of scale factor $ks_n$ will scale the system output M by the same scale factor $ks_n$ since in the linear case the output M is initially scaled by the factor $ks_n$ and a linear change in the argument $M_o$ of the calculator function $f_n$ will be balanced by the linear change in the $m_o$ argument of the function so that the control values $I'_{pn}$ will not change. A noteable feature of the system of FIG. 10E is that even if the iteration time $\Delta t$ is very long, the system output M responds immediately to adjustments of the override controls ks, and the calculator 73" responds to any change in gain of the system 70' and apportionment of the control signals $I_{p1} \ldots I_{pN}$ selected by the ratios of the respective scale factors $ks_1 \ldots ks_N$.

V. Exemplary Embodiment of Adaptive Control Method For Controlling Cutter Tip Horse power in the Turning Machine Now that the invention has been described functionally and in its broadest aspects, it should be apparent that it may be implemented in a variety of specific embodiments. To illustrate how a specific embodiment is reduced from a general functional description, a preferred exemplary embodiment for adaptive control of the actual cutter tip horsepower in a turning machine will be described in detail. In other words, the functional descriptions illustrated in FIG. 2 to FIG. 9 will be precisely defined by describing a particular adaptive control procedure for the instruction memory 60 which may be executed in the numerical control unit 50' of FIG. 8. Also, the miscellaneous signals MISC shown in FIG. 9 will be described in detail further including soft engagement, disengagement, and tool monitoring functions such as tool breakage detection, tool wear, and tool protection.

Figure 11:
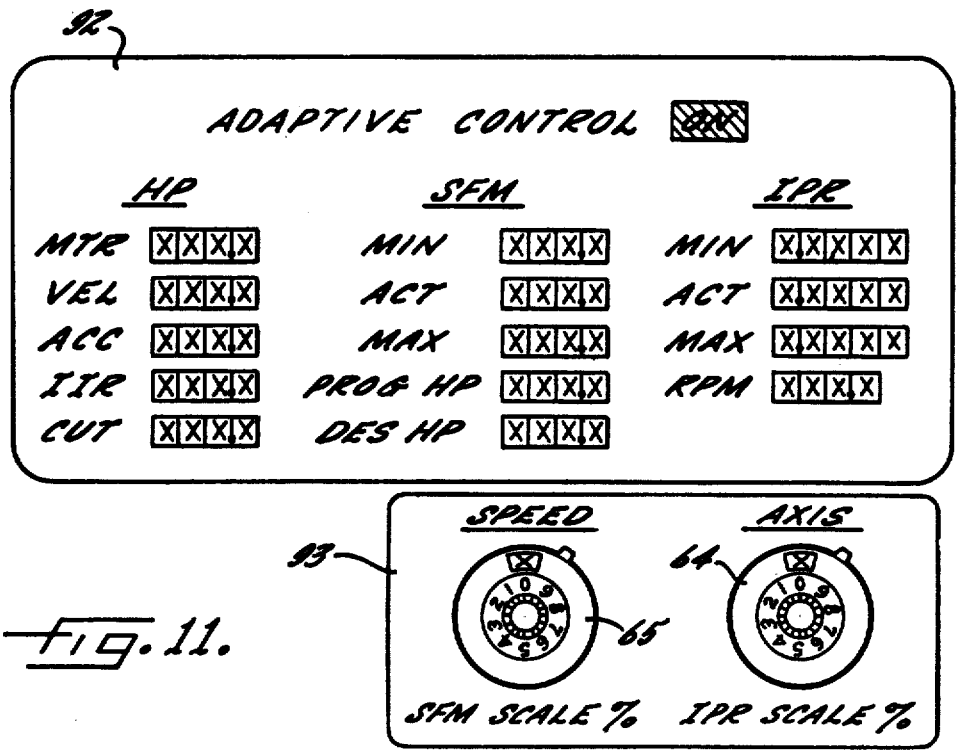
FIG. 11 is a pictorial diagram of an operator interface for use with the exemplary embodiment shown in FIG. 7.

The interface between the user and the exemplary embodiment is the operator station 45 in FIG. 7 which has a keyboard 91, a cathode ray tube display 92 and an override control panel 93 as shown in FIG. 11. The operator is informed of whether the adaptive control is off or on and is given the numerical values of the machining power in terms of $HP_m$, $HP_v$, $HP_a$, $HP_e$, and $HP_{cut}$ averages corresponding to the columns MTR, VEL, ACC, IIR, and CUT in FIG. 11. Associated with SFM are the variables $SFM_{min}$, $SFM_o$, $SFM_{max}$, $HP_{dp}$ and $HP_d$ corresponding to the column entries MIN, ACT, MAX, PROG HP and DES HP in FIG. 11. Associated with IPR, the parameters $IPR_{min}$, $IPR_o$, $IPR_{max}$, and RPM are the column entries MIN, ACT, MAX and RPM in FIG. 11.

Figure 12:
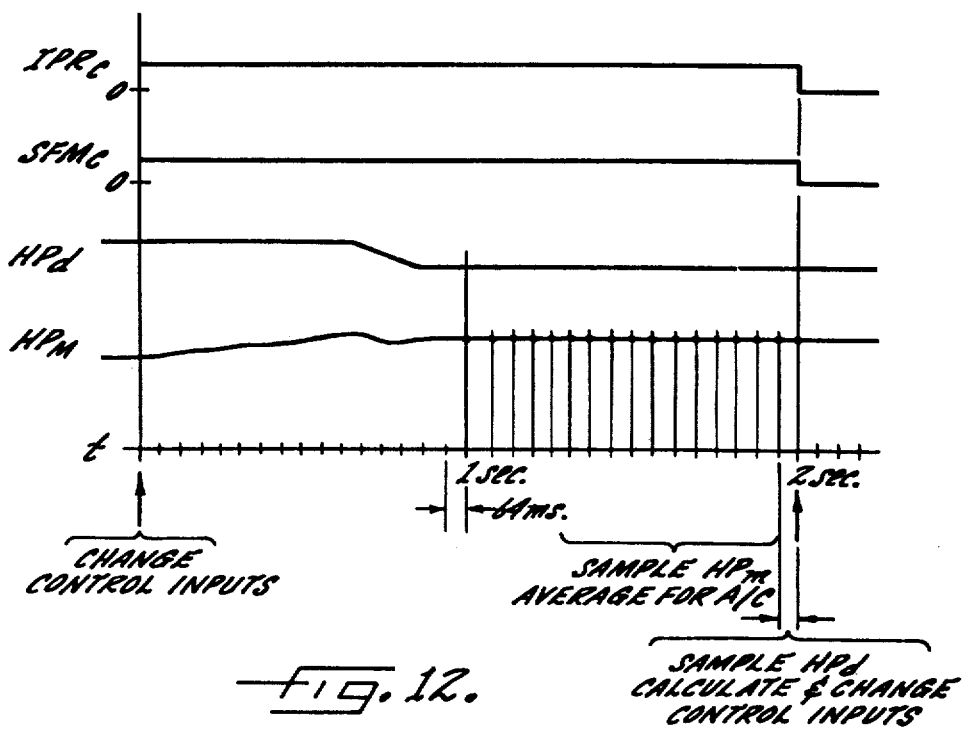
FIG. 12 is a timing diagram of the basic signals in the exemplary embodiment of the invention.

Also of relevance to the design of the exemplary embodiment for the control procedure is the actual timing involved in sampling the system inputs and outputs and set points. As shown in FIG. 12, the control inputs $IPR_c$ and $SFM_c$ are updated every two seconds. After a time delay of one second for the turning machine to respond to the change in inputs, the measured horsepower $HP_m$ is sampled at 16 points spaced 64 milliseconds apart to form an average suitable for use in the adapative control calculations. After the measured horsepower $HP_m$ is obtained, the set point $HP_d$ is compared to the actual cutter tip horsepower $HP_{cut}$ derived by correcting the measured horsepower $HP_m$ and then the control inputs $IPR_c$ and $SFM_c$ are adjusted in an amount that is estimated to bring the machining power $HP_{cut}$ into agreement with the desired set point $HP_d$.

Figure 13A:
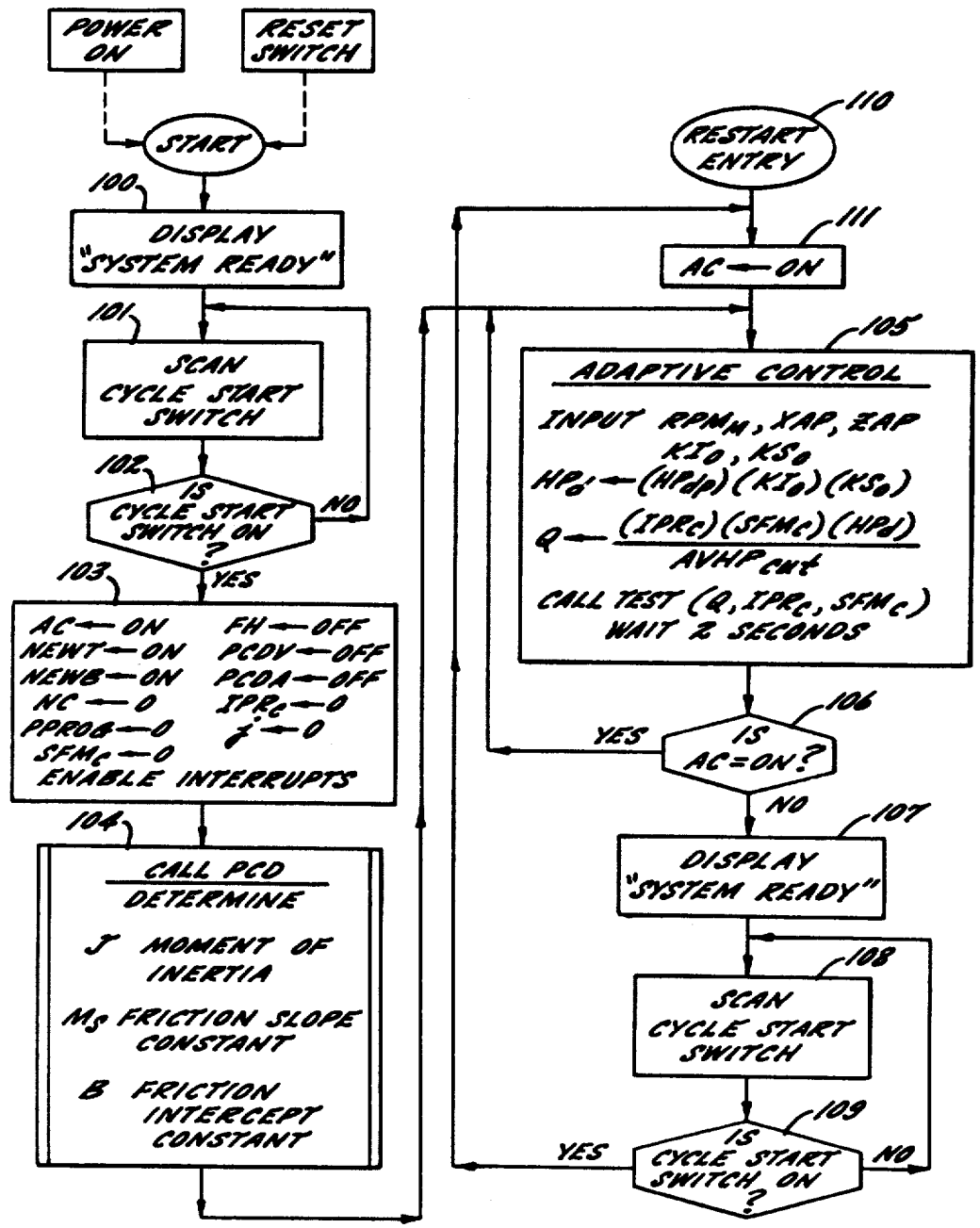

In its broadest aspects, the adaptive control procedure is defined by an executive main program that contains the iterative adaptive control loop as shown in FIG. 13A. The executive program is started when the turning machine is turned on or when a reset switch is activated. The first step 100 is for the numerical control unit to display a system ready message on the cathode ray tube of the operator station terminal. Then in step 101, the numerical control unit continuously scans the cycle start switch that is conventionally used on machine tools. When the numerical control unit determines that the cycle start switch is depressed in step 102, it knows that the machine operator has inserted a workpiece in the turning machine and has correctly inserted and adjusted a cutter in the tool holder. Then in step 103, the numerical control unit initially sets a number of software switches (i.e., flags) and accumulators to initial values and enables the interrupts which perform the background functions that are continuously and repetitively performed at 64 millisecond and 32 millisecond intervals. These switches and accumulators specifically are the adaptive control mode switch AC which provides a method of terminating the adaptive control loop upon an improper tool condition, the feed hold switch FH which tells the interrupt routines to execute a feed hold, a program constants determination switch for velocity PCDV which tells the interrupt routines to determine the velocity constants Ms and B, the program constant determination acceleration switch PCDA which tells the interrupt routines to calculate the moment of inertia J, the counter NC used to determine if there is a sufficient number of initial cut horsepower samples to use as a threshold for tool monitoring, an index PPROG to a current block in the part program memory, a switch NEWB used to determine whether a new block should be read from the part program memory, and the initial values $SFM_c$ and $IPR_c$ of SFM and IPR respectively. All of these switches and accumulators are turned off or set to zero, except for the AC switch which is turned on with $SFM_c$ set to zero and $IPR_c$ set to zero for the initial program constants determination, and the new block switch NEWB and new tool switch NEWT which are turned on so that the first part program block will be read and so that the cutting efficiency factor for the new tool will be meaasured.

After the interrupts are enabled, the subroutine PCD is called in step 104 to determine the moment of inertia J, friction slope constant Ms and friction intercept constant B. Once these initial constants are determined, the adaptive control calculations are performed in step 105 by inputting the current value of the rotational velocity $RPM_m$, the actual position of the cutter tool XAP, ZAP, and the user adjusted override factors $KI_o$ and $KS_o$. The desired horsepower setpoint $HP_d$ is calculated as a product of a programmed horsepower $HP_{dp}$ and the product of the user adjusted factors $KI_o$ and $KS_o$. Then the relative machining rate Q is calculated as the product of $IPR_c$ and $SFM_c$ adjusted by the ratio of $HP_d$ to $AVHP_{cut}$ (the latter representing determined actual cutter tip horsepower). From this new value of relative machining rate Q, new values of $IPR_c$ and $SFM_c$ are determined in a subroutine TEST. The adaptive control function 105 is then terminated by a two-second delay before the loop is closed by a test of the AC switch in step 106. Normally successive passes through steps 105 and 106 will continue during machining of a part. But if the AC switch is turned off, which would have been done by a subroutine or interrupt, a "system ready" prompt is displayed in step 107. The cycle start switch is scanned in step 108 and switch closure is detected in step 109 to restart the AC control loop at the entry point 110 whereupon the AC switch is turned on in step 111 and the adaptive control calculations repeated in step 105.

Figure 13B:
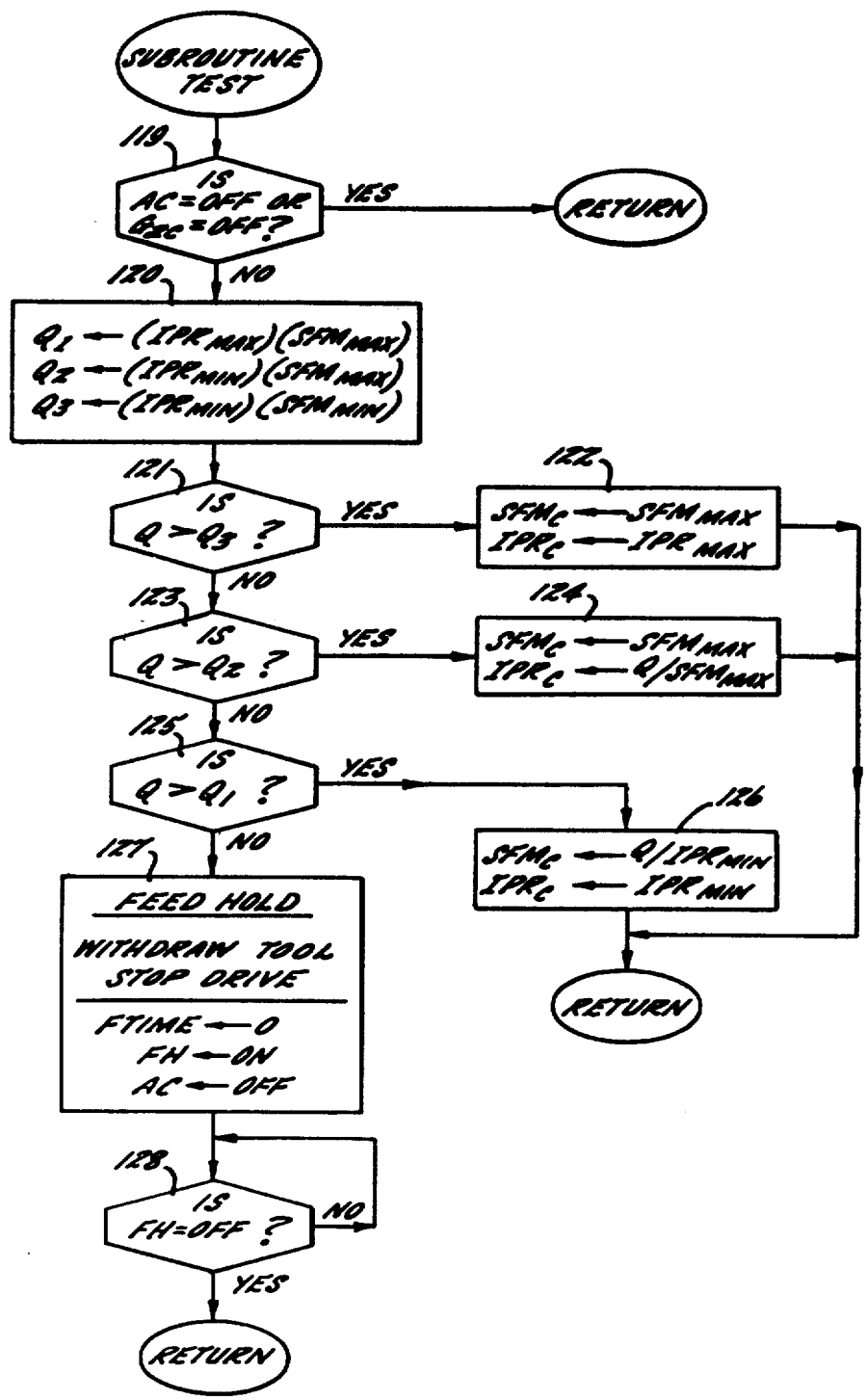

The subroutine TEST is shown in FIG. 13B. First in step 119, the switches AC and $G_{ac}$ must both be on for new values of $SFM_c$ and $IPR_c$ to be calculated; otherwise, execution of the subroutine is immediately terminated. To determine the new values of $SFM_c$ and $IPR_c$, the critical points or thresholds $Q_1$, $Q_2$, $Q_3$ for the relative machining rate are calculated in step 120 from the IPR and SFM min and max values. Recall that these values are obtained from the part program memory as will be further described below in conjunction with the description of FIG. 13E. If the new value of relative machining rate Q is greater than the highest threshold $Q_3$ as determined in step 121, then in step 122 the commanded value $SFM_c$ is set to the maximum value of SFM and the commanded value $IPR_c$ is set to the maximum value of IPR. If the relative machining rate Q is not greater than the highest threshold $Q_3$, then it is compared with the second threshold $Q_2$ in step 123 to determine if it is between the second and third thresholds $Q_2$ and $Q_3$ respectively. If it is between these two thresholds, then in step 124 the commanded value $SFM_c$ is set to $SFM_{max}$ and the commanded value $IPR_c$ is set to the commanded value Q divided by $SFM_{max}$. If the value of Q is not greater than the second threshold $Q_2$, then in step 125 the value of Q is compared to the lowest threshold $Q_1$ and if it is greater than the lowest threshold $Q_1$ or thus between the lowest threshold $Q_1$ and the second threshold $Q_2$, then in step 126 the commanded value of $SFM_c$ is set to the value of Q divided by $IPR_{min}$ and the commanded value $IPR_c$ is set to $IPR_{min}$. But if the value of Q is not greater than the lowest threshold $Q_1$, then the value of Q cannot be obtained by any permissible combination of the commanded values $SFM_c$ and $IPR_c$ in which case the machining process must be terminated. Thus in step 127, a "feed hold" is requested together with action which causes withdrawal of the tool and stopping of the drive. For this purpose, the feed hold timer FTIME is set to zero and the feed hold switch FH is turned on, and the AC switch is turned off. The feed hold switch FH passes a feed hold request to the 32 mS interrupt where it is serviced as shown in FIG. 13D as described below. When it is serviced as detected by step 128, execution returns to the adaptive control step 105 in FIG. 13A and since the adaptive control switch AC was turned off, the adaptive control loop will be terminated by step 106 until the cycle start switch is reset by the operator and detected by the numerical control unit in step 109 of FIG. 13A.

Figure 13C:
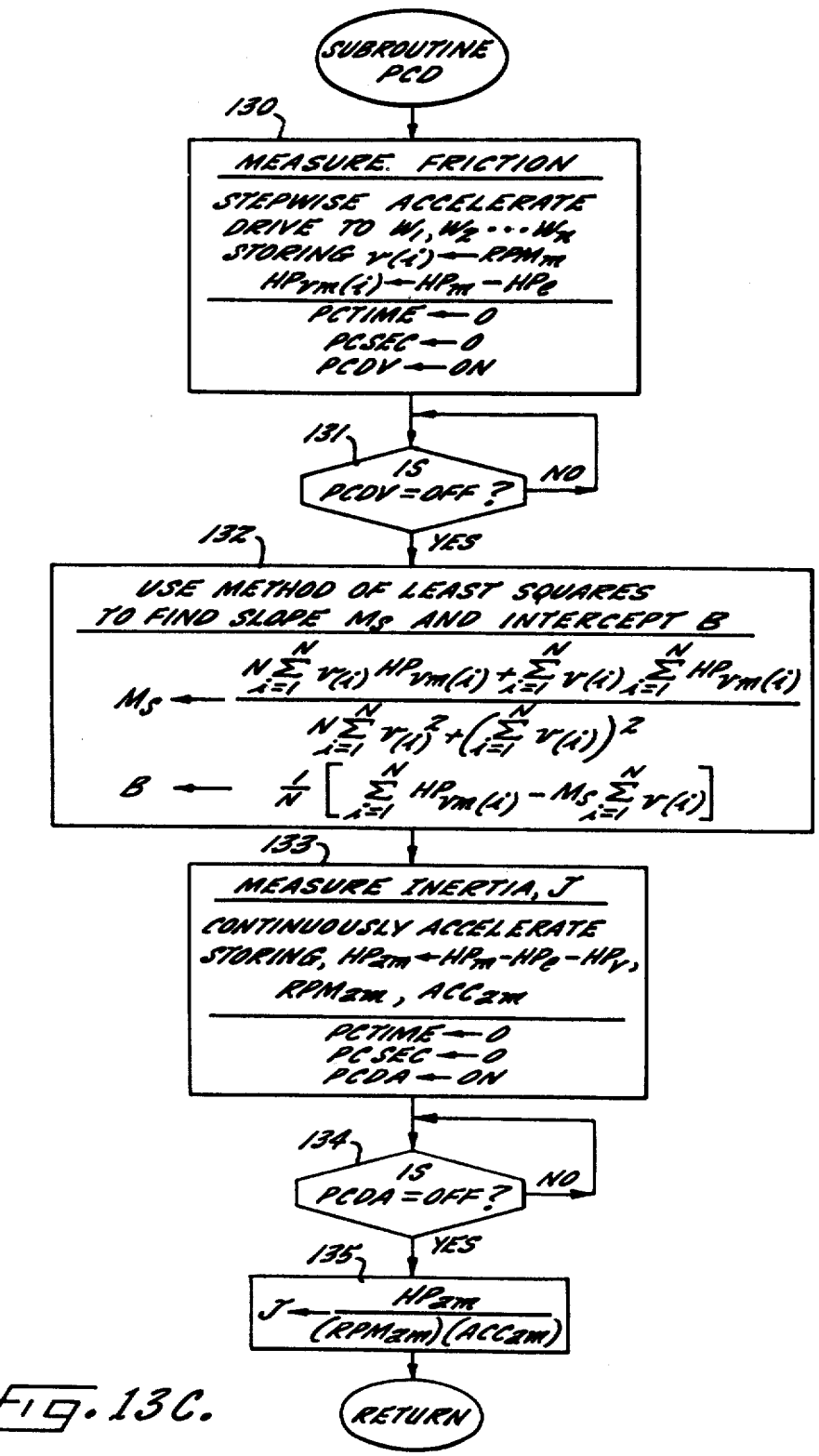

The determination of the program constants is performed by the subroutine PCD shown in FIG. 13C. First the 32 mS interrupt described below in FIG. 13D is requested to stepwise accelerate the drive to a plurality of angular velocities corresponding to the acceleration shown in FIG. 3 by setting the program constant timers PCTIME and PCSEC to zero and setting the velocity program constant switch PCDV on. The subroutine PCD then waits for the request to be serviced by sensing in step 131 whether the switch PCDV is off. When PCDV is off, the interrupt routine in FIG. 13D has measured the frictional horsepower $HP_{vm}$ at a number of different values of RPM which are stored in a vector v. Then the friction constants Ms and B are determined from these data points by the standard statistical technique of least squares according to the equations summarized in step 132. After the friction slope Ms and intercept B are determined, the horsepower due to acceleration is calculated as requested by step 133 by setting the program constant timers PCTIME and PCSET to zero and turning on the acceleration switch PCDA. This request is processed by the interrupt in FIG. 13D which continuously accelerates the drive as shown in FIG. 3B and described below, and when the subroutine PCD senses that the servicing is complete by testing the switch PCDA in step 134, the moment of inertia J is calculated in step 135 in accordance with equation 2-12.

A 32 millisecond interrupt (FIG. 13D) is used to service the feed hold, program constants determination, soft engagement, and soft disengagement functions and to read the part program memory, calculate the path vectors and provide the axis control of the cutter feed and machine tool drive. The feed hold function is performed if the feed hold switch FH is on as detected in step 140 whereupon the feed hold timer FTIME is incremented in step 141. The feed hold timer is in effect a program step counter for executing a feed hold sequence. Thus the end of the feed hold sequence is determined by comparing the feed hold timer FTIME to an end time FEND in step 142 and if the end time is reached, the feed hold switch is set off in step 143 to complete the interrupt procedure, thus passing the feed hold switch FH back to step 128 in FIG. 13B indicating that the feed hold sequence is completed. But if the feed hold timer FTIME is less than the end time FEND, the cutter is backed out of the workpiece as a function of the feed hold timer FTIME to terminate the machining process. The simplest method of backing the cutter out of the workpiece is to reverse the direction of the cutter feed by reversing the path vectors Ip and Jp as shown in step 144. Also the commanded rate of the feed $IPR_c$ is set to $IPR_{min}$ so that the rate of retraction is a constant value. When the feed hold timer FTIME reaches a stop time FSTOP, the feed and drive are stopped by setting $IPR_c$ to zero and $SFM_c$ to zero so that the cutter is retracted from the workpiece by a generally constant distance. The actual retraction of the cutter is for convenience performed by the AXIS subroutine in step 145.

The 32 millisecond interrupt of FIG. 13D also initially cycles the machine tool with the cutter disengaged according to the angular velocity profile of FIGS. 3A and 3B for program constant determination. If the interrupt detects that either the acceleration switch PCDA or the velocity switch PCDV is on, in step 150, the program constant timer PCTIME and PCSEC are serviced so that the timer PCSEC indicates the number of seconds into either the stepwise acceleration sequence of FIG. 3A or the continuous acceleration sequence of FIG. 3B by performing the incrementing and comparisons of steps 151, 152, 153, 154, and 155. From these steps, it is seen that the timer PCTIME counts out 32 interrupt intervals each time the second counter PCSEC, is incremented.

The velocity switch PCDV is tested in step 156, and if it is on the velocity stepwise acceleration sequence is initiated. The second counter PCSEC is compared to an end time PVEND at step 158 to determine if the velocity sequence is finished and if so, the program constant determination switches PCDA and PCDV are turned off in step 157. But if the second counter PSEC is less than the end time PVEND, then the velocity switch PCDV is tested to determine whether the step-wise acceleration is required for velocity constants determinations as shown in step 158. If the velocity switch PCDV is on, then the drive velocity is increased in steps at ten second intervals according to step 159. The ten second intervals are conveniently tested by determining whether the second counter PSEC is divisible by 10 and if so, the current rotational velocity is measured and put into a velocity array v using the ten second counter IPSEC as an index and the horsepower due to friction coincident with the velocity is calculated and put into an array $HP_{vm}$ also using the ten second counter IPSEC as an index. It should be noted that this horsepower due to frictional velocity is just the average measured horsepower $AVHP_m$ minus the average horsepower lost in the electrical drive motor due to the effective resistance of the motor windings $AVHP_e$. These averages are calculated in the 64 millisecond interrupt routine of FIG. 13G, further described below. After the velocity array v and horsepower due to velocity array $HP_{vm}$ are updated, the commanded velocity $RPM_c$ is stepped to the next level as programmed in a predetermined constant energy PVRPM also using the second timer IPSEC as an index. Then the commanded value $RPM_c$ is outputted in step 160 to accelerate the drive.

While the determination of the friction constants Ms and B requires a stepwise change in the rotational velocity, the determination of the moment of inertia J requires a continuous net acceleration, which of course may be either positive or negative. For this purpose, the acceleration switch PCDA is tested during each of the 32 millisecond interrupt times at step 170. Then the second timer PSEC is compared in step 171 to an end time PAEND to determine if the acceleration sequence is completed. If it is not completed, then according to the preferred acceleration sequence of FIG. 3B for a DV drive motor, the drive is stopped and, in latter passes through step 172 of the 32 millisecond interrupt, the DC drive power motor is stepwise commanded to a maximum RPM, RPMH, that is greater than the motor's base speed BS. The measured values $HP_{am}$, $RPM_{am}$, and $ACC_{am}$ are also determined so long as the rotational velocity $RPM_m$ is less than base speed BS. The net horsepower transferred to the inertial mass of the machine tool drive $HP_{am}$ is calculated by subtracting the horsepower loss due to the electrical resistance in the drive motor windings $HP_e$ and the horsepower loss due to the mechanical friction in the machine tool drive $HP_v$ from the horsepower $HP_m$ consumed by the drive motor. Note that when the acceleration sequence is completed, the measured values $HP_{am}$, $RPM_{am}$ and $ACC_{am}$ will be those values measured just before RPM exceeds the base speed BS. This completes the control of the machine tool drive for calculation of the program constants in the 32 millisecond interrupt.

Turning now to FIG. 13E, which is actually a continuation of the 32-millisecond interrupt as indicated by the off-page connector E which is common to FIG. 13D and FIG. 13E, it is seen that the new block switch NEWB is tested in step 180. If the switch is on, the part program memory considered as an array labelled PPMEM is read in step 181 at all memory locations representing the next block. The offset index of the part program memory PPMEM array, the block offset BLKOFST, is calculated as the product of a block number PPROG and the number NBLK of part program memory locations per block. The value of the part program memory at the block offset BLKOFST is the first block constant in the block which is the Z coordinate ZCEP of the desired ending position. When ZCEP is read, it is also desirable to store an initial Z coordinate which could in fact be the old Z coordinate ZCEP but as shown it is probably more desirable to store the actual position ZAP as the initial coordinate $Z_{in}$. Similarly, the next target X coordinate XCEP is read at location BLKOFST+1 and similarly the other block constants generally represented as an array G are read at increasing part program memory PPMEM locations. These other constants include, for example, the maximum IPR operating level $IPR_{max}$, the minimum IPR operating level $IPR_{min}$, the maximum SFM operating level $SFM_{max}$, the minimum SFM operating level $SFM_{min}$, the target horsepower $HP_{dp}$, the incremental beginning distance Ap, the incremental ending distance Bp, the AC flag $G_{ac}$, the soft engagement flag $G_{soft}$, the tool monitor flag $G_{tm}$, the tool breakage flag $G_{tb}$ and minimum CEFR factor $C_{min}$, the tool protect flag $G_{tp}$ and maximum CEFR factor $C_{max}$, and the tool wear flag $G_{tw}$ and AVCFR factor $C_{tw}$. Alternatively, these flags and constants may be handled in the known modal fashion; i.e., only changes in the logic states of the flags or changed values of the block constants are programmed in the part program memory.

In step 182, the path vectors Ip and Jp and the resultant path length PATH are calculated from the differences between the initial and target coordinates. To complete these steps of reading and processing the current block of the part program memory, the new block switch NEWB is switched off in step 183 so that the next block will be read only when requested by the AXIS subroutine in FIG. 13F as described below.

A. Soft Engagement Function

The 32 millisecond interrupt also performs a soft engagement function. One of the miscellaneous constants stored in the part program memory is a soft switch $G_{soft}$ which signals that the current vector is either into workpiece surface if the AC flag $G_{ac}$ is also off, or is a path that will break out of the workpiece if the flag $G_{ac}$ is also on.

If the cutting tool is not engaged with the workpiece, then the adaptive control should be off since then the cutting power is not responsive to either IPR or SFM. Thus, there must be some method for initially contacting the cutter with the workpiece and turning the adaptive control on. The applicants have discovered that the preferable method of initially contacting the workpiece with the cutter and turning the adaptive control on is to command the SFM at the maximum value $SFM_{max}$ and the IPR at the minimum value $IPR_{min}$ and to drive the cutter a sufficient depth into the workpiece for the measured horsepower values to stabilize. The point of initial contact may be determined either by knowing beforehand the workpiece profile or by actually measuring the increase in cut horsepower $HP_{cut}$ when the cutter contacts the workpiece. In the exemplary embodiment, both methods will be described. The adaptive control is turned on when the cutter position (XAP, ZAP) is a pre-determined distance Ap from the initial position ($X_{in}$, $Z_{in}$) which is presumed to have been programmed by the prior block target coordinates (XCEP, ZCEP) to be the feed position of the workpiece surface. But in the exemplary embodiment, the increase in cutting horsepower $HP_{cut}$ above a threshold level $HP_{air}$ set to be greater than the air or noise value of cutter horsepower $HP_{cut}$ when the cutter is disengaged, is used to insure that measurements of the cutter horsepower $HP_{cut}$ are considered only when the cutter is engaged with the workpiece. The initial measurements of $HP_{cut}$ are used to calculate an initial horsepower $HP_{incut}$ which is itself used to calculate an initial relative cutting efficiency $CEFR_{in}$. This initial relative cutting efficiency is used for detecting tool breakage, tool wear, and to protect the tool from excessive transient forces as further described below in conjunction with the tool monitor function.

Turning again to FIG. 13E, if the adaptive control flag $G_{ac}$ is off as detected in step 184 and the soft engagement flag $G_{soft}$ is on as detected in step 185, the soft engagement function has been selected. The distance gone from the initial coordinates ($X_{in}$, $Z_{in}$) is calculated in step 186. In step 187, the distance gone DGONE is compared to a pre-programmed initial cut distance Ap, which is one of the miscellaneous constants G(i) read from the part program memory blocks, to determine whether initial cutting is taking place. In step 188, which is also an alternate method of determining when the initial cutting has started, the cut horsepower $HP_{cut}$ is compared to an air cut threshold value $HP_{air}$ and if the cutting horsepower $HP_{cut}$ is less than this initial air cut value, a sample counter NC is set to zero in step 189 since the measured cutting horsepower $HP_{cut}$ is probably indicative of cutting air rather than machining the workpiece. Otherwise, the counter NC is incremented as shown in step 190. In either event, during the initial cut into the workpiece, the commanded $SFM_c$ is set to its maximum value $SFM_{max}$ and the commanded $IPR_c$ is set to its minimum value $IPR_{min}$ as shown in step 191. When step 187 signals that the distance gone DGONE is greater than the pre-determined initial cut distance Ap, the adaptive control is turned on by setting the switch $G_{ac}$ on and the soft engagement is turned off by setting the switch $G_{soft}$ off in step 192.

An initial relative cutting efficiency is determined in the steps generally designated 193 by first calculating an initial cut horsepower $HP_{incut}$ and then calculating the initial relative cutting efficiency $CEFR_{in}$ as the initial cutting horsepower $HP_{incut}$ divided by the product of the control values $SMF_o$ and $IPR_o$. The control values $SFM_o$, $IPR_o$ are used instead of the commanded values $SFM_c$ and $IPR_c$ since for constant $SFM_c$ and $IPR_c$, a change in the override controls changes the cut horsepower $HP_{cut}$, but does not change the ratio of the cut horsepower $HP_{incut}$ divided by the control values $SFM_o$ and $IPR_o$. For cutting efficiency calculations, it is assumed that the control values $SFM_o$ and $IPR_o$ do not instantaneously change and thus represent the actual values of SFM and IPR, which can be assured by a suitable method of inputting the scale factors $KI_o$ and $KS_o$ into the numerical control unit. If these user adjusted scale factors are obtained by reading potentiometers with an analog to digital converter, for example, the fact that the operator cannot instantaneously change the positions of the potentiometer controls guarantee that the scale factors cannot instantaneously change. Otherwise digital low-pass filtering can be added to insure that the filtered values $SFM_o'$ and $IPR_o'$ do not rapidly change, and this is the preferred method. The AXIS subroutine, shown in FIG. 13F, includes such digital filtering. The precise steps generally designated 193 are further described below in conjunction with the tool monitor subroutine TLMNTR of FIG. 13H.

B. Soft Disengagement

Since the adaptive control cannot function properly when the cutter is cutting air, there must be some means to turn it off if the cutter is about to cut through the workpiece. The applicants have discovered that the best method of disengaging the cutter from the workpiece and terminating the adaptive control, which would otherwise accelerate to attempt to maintain constant machining power, is to sense when the cutting tool is within a pre-set distance Bp of breaking out of the workpiece, and thereupon the decrease the feed velocity of the cutter to the minimum feed velocity $IPR_{min}$ while maintaining SFM generally at the then-current value until the cutter breaks out of the workpiece.

Shown in FIG. 13E, the soft disengagement function is performed when the adaptive control flag $G_{ac}$ is on as detected in step 184 and when the soft engagement switch $G_{soft}$ is on as detected in step 195. The target coordinates (XCEP, ZCEP) are pre-programmed in the part program for the block with the AC flag set on and the soft engagement switch $G_{soft}$ set on to signal that the cutter is expected to break out of the surface of the workpiece. Then the distance to go before breaking out DTG is calculated in step 196 as the distance between the actual cutter position (XAP, ZAP) and the target coordinates (XCEP, ZCEP). To determine whether it is time to turn off the adaptive control and to reduce the IPR to $IPR_{min}$, the distance to go DTG is compared with an incremental ending distance Bp in step 197 and if the distance to go DTG is less than the incremental ending distance Bp, the commanded $IPR_c$ is set to the minimum value $IPR_{min}$, the adaptive control is inhibited by setting the flag $G_{ac}$ off, and the soft engagement feature is terminated by setting the switch $G_{soft}$ off as shown in step 198.

Figure 13F:
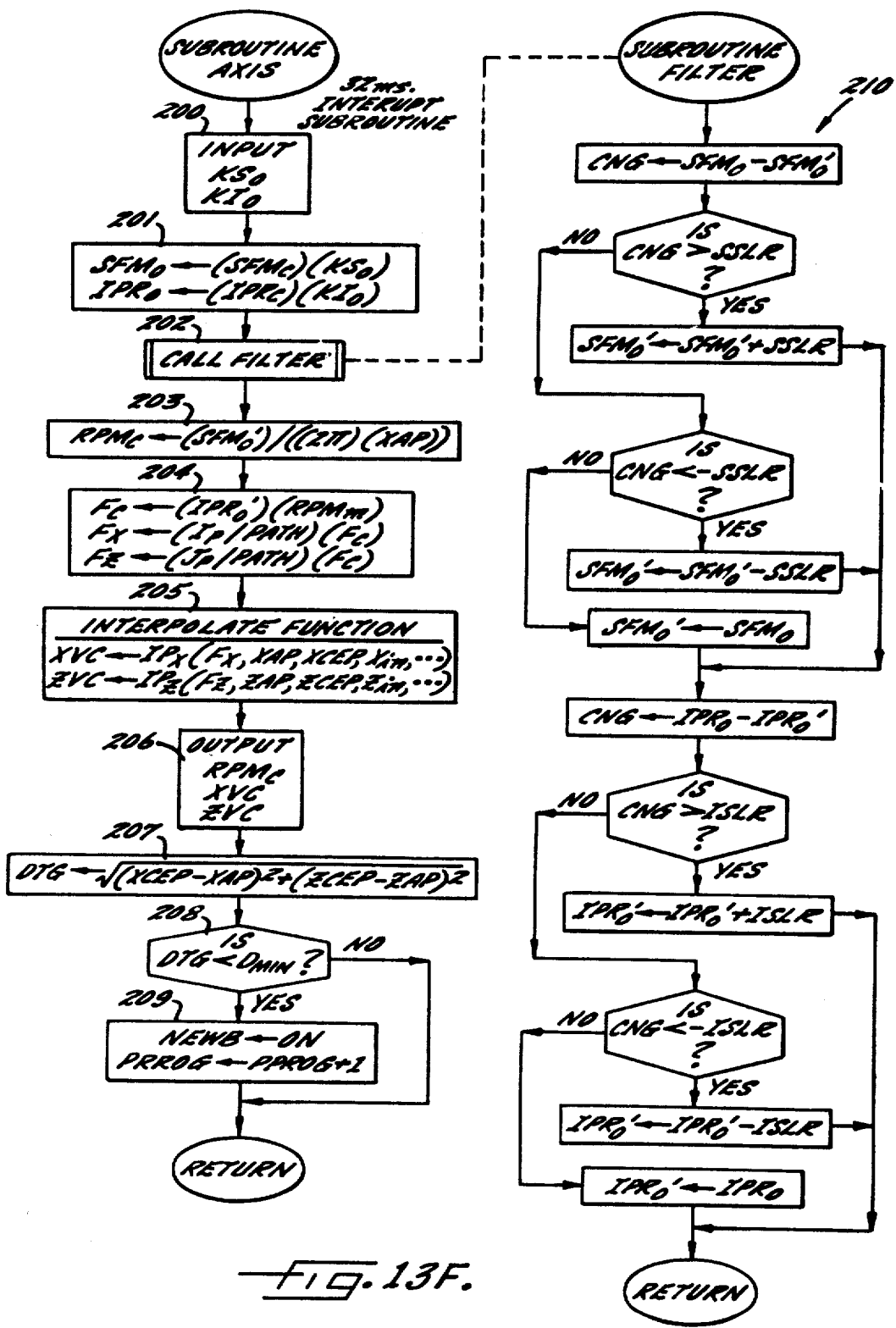

The 32 millisecond interrupt of FIGS. 13D and 13E is completed in step 199 by calling the AXIS subroutine of FIG. 13F which generates the actual machine control signals $RPM_c$, XVC and ZVC from the commanded values $SFM_c$ and $IPR_c$.

The AXIS subroutine first inputs the user adjusted scale factors $KS_o$ and $KI_o$ from the override controls in step 200. Then the control values $SFM_o$ and $IPR_o$ are computed by scaling the commanded values $SFM_c$ and $IPR_c$ by the scale factors $KS_o$ and $KI_o$, respectively in step 201. These control values are then filtered by calling the subroutine FILTER to generate filtered control values $SFM_o'$ and $IP_o'$ in step 202. Then the commanded value of rotational velocity $RPM_c$ is calculated in step 203 as $SFM_o'$ divided by the product $2\pi$ times the actual position coordinate XAP which is in effect the radius $R_{av}$ from the axis of the workpiece to the cutter edge. In step 204, the magnitude of the resultant cutter feed velocity $F_c$ is calculated as the product of the control value $IPR_o'$ and the measured value $RPM_m$ and the X and Z displacement components $F_x$ and $F_z$ may be calculated by scaling the magnitude of the resultant $F_c$ by the factors Ip divided by PATH and Jp divided by PATH respectively.

In step 205, the components of the cutter feed velocity are passed to an interpolation function which converts them to the actual feed motor control signals XVC and ZVC. The simplest interpolation function merely sets the value of the motor control signals proportional to the feed velocity components $F_x$, $F_z$. Thus the cutter feed for a simple linear intrepolation moves the cutter tool from the initial coordinates ($X_{in}$, $Z_{in}$) to the final coordinates (XCEP, ZCEP) in a straight line. But it is sometimes desirable to move the cutter tool along a nonlinear path such as an arc of a given radius. The radius, for example, is one of the miscellaneous block constants G(i) stored in the part program memory. In such a case, the feed motor control signals XVC and ZVC are a function of the actual position coordinates (XAP, ZAP) in relation to the initial coordinates ($X_{in}$, $Z_{in}$) and the final coordinates (XCEP, ZCEP). Further details a preferred interpolation function are provided in U.S. Pat. No. 3,656,124 issued Apr. 11, 1972 to John K. McGee, which is herein incorporated by reference. After each interpolation update at a 32 mS rate, the machine control signals $RPM_c$, XVC and ZVC are outputted in step 206 to effect a change in the machining process.

The AXIS subroutine also determines whether it is time to read a new block of constants from the part program memory. The distance to go DTG to the final coordinates (XCEP, ZCEP) is calculated in step 207 and compared to a minimum value $D_{min}$ in step 208. If the distance to go DTG is less than the minimum value, then the new block switch NEWB is turned on and the block pointer PPROG is incremented. This completes the AXIS subroutine.

Also shown in FIG. 13F is the subroutine FILTER generally designated 210 which limits the time rate of change of the filter output variables $SFM_o'$ and $IPR_o'$ to slew rate limits SSLR and ISLR respectively representing the permissible change in the output values per 32 millisecond interrupt interval. Some kind of digital filtering is preferable so that the control values $SFM_o'$ and $IPR_o'$ do not instantaneously change which could falsely trigger the tool function subroutine TLMNTR of FIG. 13H or which might possibly overdrive the feed and drive motors. It should also be noted that the subroutine FILTER has the effect of spreading out or softening the changes commanded by the adaptive control loop of FIG. 13A as actually executed in the subroutine calls to the TEST subroutine of FIG. 13B at steps 122, 124 and 126. The specific details of such digital filtering are not critical to the practice of the present invention, and will not be further described. An alternate approach for smoothing out large step changes in velocity, whether created by the part program or by the adaptive action here described, is disclosed in Kolell U.S. Pat. No. 4,041,287 to which the reader may refer.

Figure 13G:
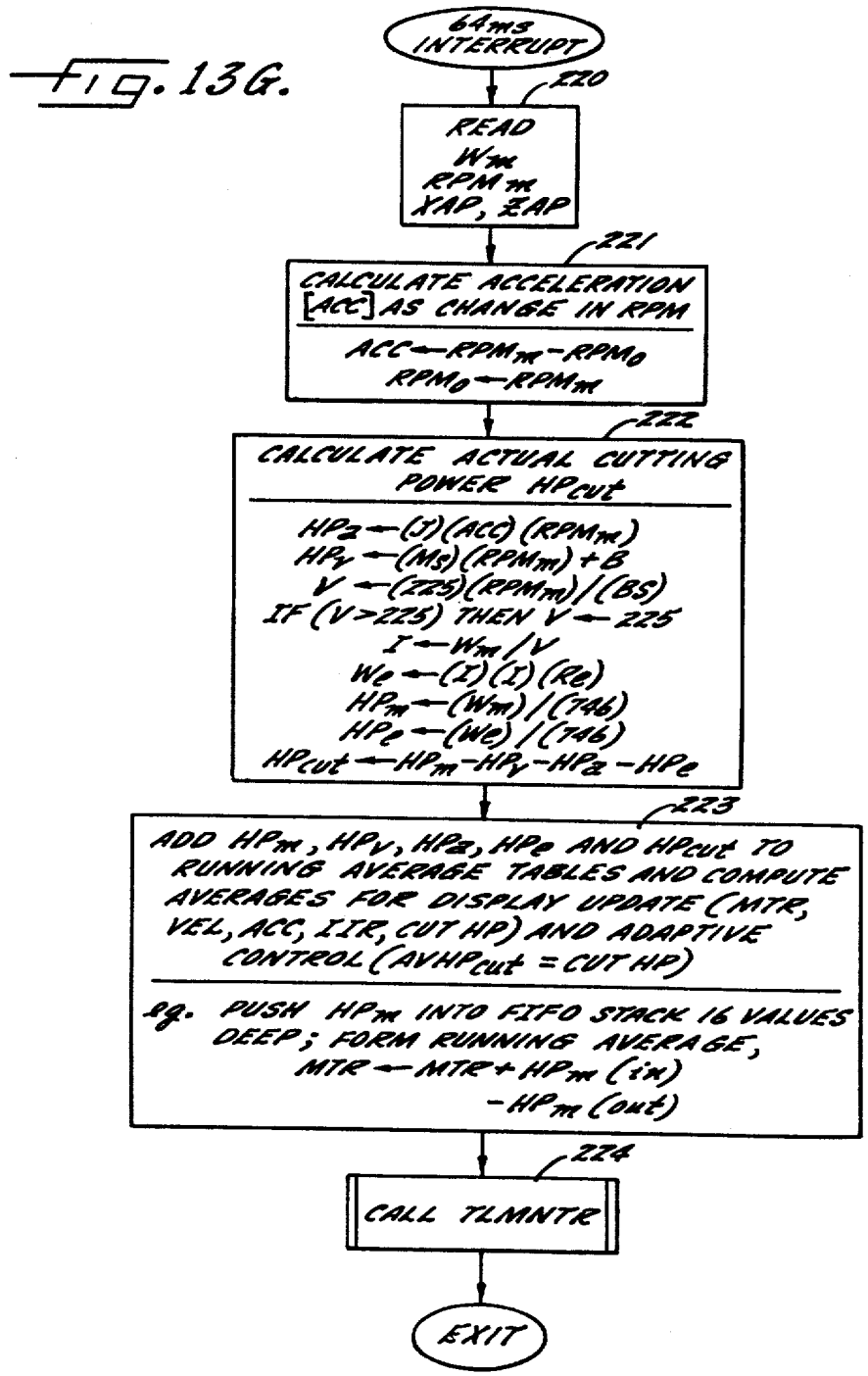

The actual horsepower expended at the cutter tip $HP_{cut}$ is calculated and averaged at 64 millisecond intervals in an interrupt routine shown in FIG. 13G. The interrupt also performs a tool monitoring function since preferably the detection of a broken tool or excessive loads on a tool occurs quickly to reduce the damage done to the tool or workpiece. The 64 millisecond interrupt reads the electrical power consumed by the drive motor in watts $W_m$, the actual rotational velocity of the drive $RPM_m$, and the actual cutter tip position coordinates XAP, ZAP in step 220. Then in step 221, the rotational acceleration ACC is calculated as the change in rotational velocity over the 64 millisecond interrupt interval. The corrections to the measured power $W_m$ to obtain an actual cutting power $HP_{cut}$ are performed in step 222. The net horsepower transferred to the inertial mass of the rotating parts of the machine tool $HP_a$ is calculated as a product of the pre-determined moment of inertia J (previously stored in step 135 in FIG. 13C), the rotational acceleration ACC, and the rotational velocity $RPM_m$. The power taken up by the mechanical friction in the machine tool drive $HP_v$ is calculated as the sum of the intercept constant B and the product of the slope constant Ms (such constants being previously stored at step 132 in FIG. 13C) and the rotational velocity $RPM_m$. The voltage V across the drive motor terminals is calculated as the maximum drive voltage to the motor in volts, times the rotational velocity $RPM_m$ divided by the predetermined base speed constant BS. (It should be noted that some motor drives have adjustment controls for setting the base speed BS and maximum drive voltage to values different from the maximum rated voltage and rated base speed of the motor. These motor drives, for example, regulate the motor's field excitation to alter the electrical characteristics of the motor. In accordance with FIG. 13G, step 222, a 240 volt DC motor was adjusted for a maximum drive voltage of 225 volts.) Then the current I through the motor windings is computed by dividing the power in watts to the drive motor $W_m$ by the voltage V. The electrical power consumed by the resistance in the motor windings $W_e$ in watts is computed as the square of the current I and the pre-determined constant of resistance $R_e$ of the motor windings in ohms. Then the measured horsepower $HP_m$ and the electrical horsepower $HP_e$ dissipated in the motor windings are obtained from the corresponding values in watts $W_m$ and $W_e$ respectively by dividing the wattage values by the units conversion factor 746 watts per horsepower. Finally, the cut horsepower $HP_{cut}$ is obtained by adjusting the measured horsepower $HP_m$ by subtracting the mechanical friction loss $HP_v$, the horsepower due to acceleration $HP_a$ and the net horsepower due to electrical loss in the motor windings $HP_e$.

In step 223, the various horsepowers $HP_m$, $HP_d$, $HP_a$, $HP_e$, and $HP_{cut}$ are added to running average tables and averages are computed for updating the display and for obtaining the average cut horsepower $AVHP_{cut}$ adaptive control. These averages are obtained by pushing the horsepower values into a first-in-first-out (FIFO) stack, for example 16 values deep. Then the running averages are formed by incrementing the average by the horsepower pushed into the stack and subtracting from the average the horsepower pushed out of the stack.

To complete the 64 millisecond interrupt routine, the tool monitoring subroutine TLMNTR is called in step 224.

C. Tool Monitoring Functions

Figure 13H:
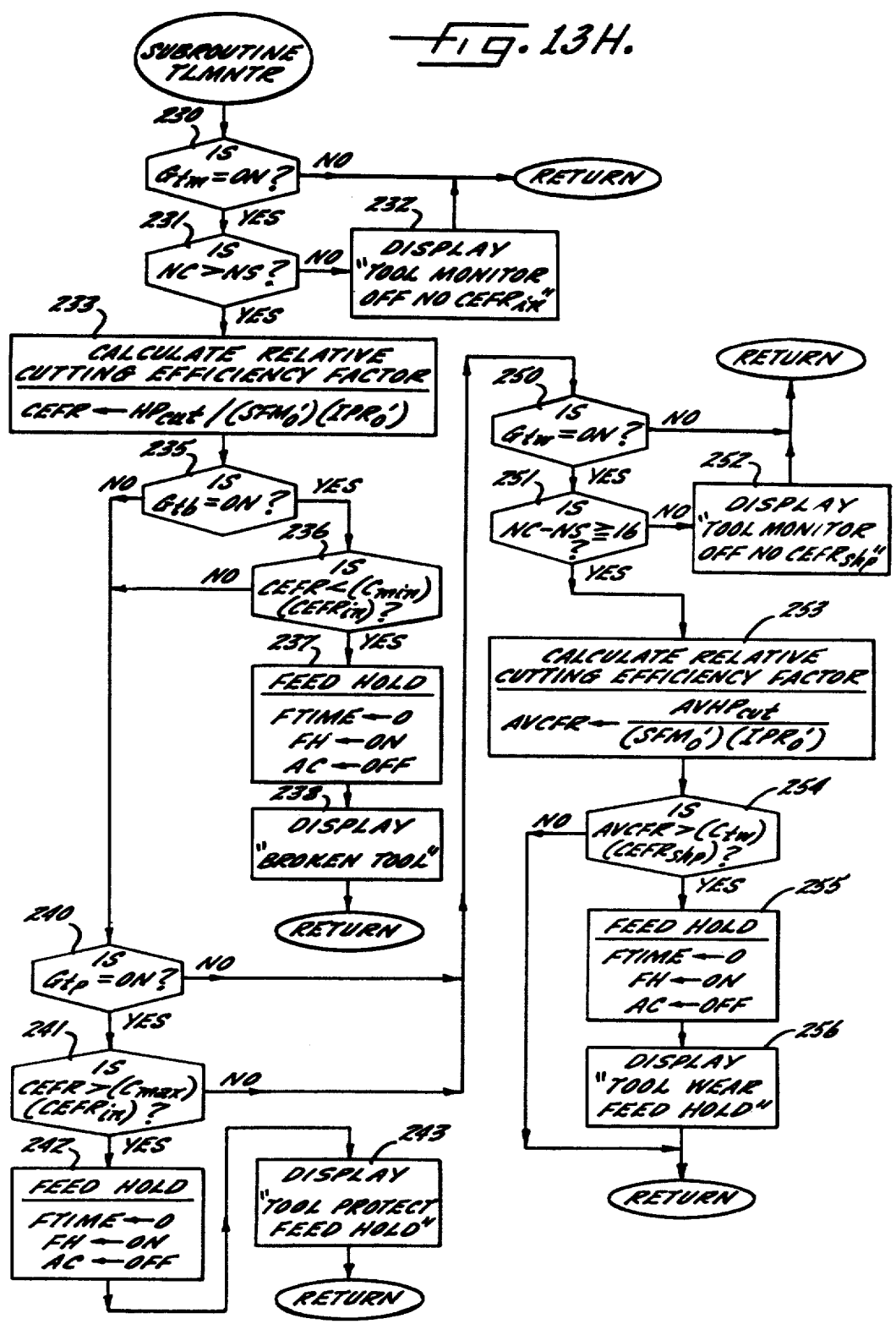

The subroutine TLMNTR in FIG. 13H calculates a relative cutting efficiency factor CEFR and detects improper tool conditions including a broken tool, an excessive tool load and a worn tool by comparing the relative cutting efficiency factor to an initial relative cutting efficiency factor. Recall that as defined in Equation (3-5) CEFR measures the inefficiency or dullness of a cutter. Equivalently, the reciprocal of CEFR measures the efficiency or sharpness of the cutter, and alternatively this reciprocal value could be compared to an initial reciprocal value. Of course, such an alternative is mathematically equivalent since merely the direction of an inequality is reversed when reciprocals of the terms are taken.

The tool monitoring may be disabled by a switch $G_{tm}$ obtained from and associated with each block in the part program memory. When the part program is made, program blocks representing paths initially into or out of a workpiece are programmed with this switch $G_{tm}$ off so that cutting air or initial contact with the workpiece will not be interpreted as a broken tool or an excessive tool load. The tool monitor switch $G_{tm}$ is tested in step 230 and if it is off the tool monitor subroutine is done. Otherwise in step 231 the counter NC is compared with the pre-determined number NS to determine whether an initial relative cutting efficiency factor $CEFR_{in}$ was determined in FIG. 13E. If not, then there is probably an error in programming of the tool monitoring switch $G_{tm}$ in the part program so that the error condition is displayed to the machine operator in step 232. Otherwise the relative cutting efficiency factor is calculated in step 233 as $HP_{cut}$ divided by the product of $SFM_o'$ and $IPR_o'$. It should be noted that performing comparisons of relative cutting efficiency factors to monitor tool conditions requires that the depth of cut D is generally constant, since it is the actual cutting efficiency factor $CEF_v$ defined as the horsepower required to remove a unit volume of material, that is relatively constant and $CEF_v$ equals $CEFR/D$. Of course, if the depth of cut D is not constant but is known, the actual cutting efficiency factor may be calculated or equivalently the relative cutting efficiency factor CEFR may be adjusted by the ratio of the depths for the initial cutting efficiency factor versus the current cutting efficiency factor according to the equation:

$$CEFR' = (CEFR)(D_{in})/(D_a) \qquad (5\text{-}1)$$

where $D_{in}$ is the initial depth and $D_a$ is the current depth. Then the adjusted cutting efficiency factor CEFR' may be compared to the initial cutting efficiency factor $CEFR_{in}$. The depth of cut D may be a miscellaneous parameter G(i) stored in each block of the part program memory.

Once the relative cutting efficiency factor CEFR is determined, it is compared to maximum and minimum limit values to determine if an improper tool condition exists. The maximum limit value must be larger than the initial relative cutting efficiency factor $CEFR_{in}$ and preferably the maximum and minimum limits are determined by multiplying the initial cutting efficiency factor $CEFR_{in}$ by constants slightly greater or slightly less than 1, respectively. For example, if the broken tool switch $G_{tb}$ is on, as detected in step 235, then the relative cutting efficiency factor CEFR is compared to the product of the initial cutting efficiency $CEFR_{in}$ and a minimum factor $C_{min}$ as shown in step 236, with $C_{min}$ chosen to be slightly less than 1, for example 0.85. If the relative cutting efficiency factor CEFR exceeds this minimum limit then a "feed hold" is requested in step 237 by clearing the feed hold timer FTIME, setting the feed hold switch FH on and turning the adaptive control switch AC off. Then the broken tool condition is displayed to the operator in step 238 which completes the execution of the subroutine TLMNTR.

Another tool monitoring function that may be performed is the detection of excessive transient loads on the cutting tool. To protect the tool from these transient loads, the cutting efficiency factor is monitored and compared to a maximum limit since a transient load is characterized by a sharp increase in the cut horsepower $HP_{cut}$ while the relative machining rate $(SFM_o')(IPR_o')$ remains relatively constant so that the relative cutting efficiency factor CEFR rises nearly instantaneously coincident with the transient increase in cut horsepower $HP_{cut}$. The applicants have discovered that to catch these transients, the cutting efficiency factor is preferably repetively calculated at a fast rate, for example every 64 milliseconds which is the rate of the interrupt calling the subroutine TLMNTR.

As shown in FIG. 13H, the tool protect switch $G_{tp}$ from the current block of the part program memory is tested in step 240 and if it is on then the relative cutting efficiency factor CEFR is compared to a high threshold determined by the product of a maximum factor $C_{max}$ pre-set substantially greater than 1, for example, 1.2, and the initial cutting efficiency factor $CEFR_{in}$, as shown in step 241. If the relative cutting efficiency factor CEFR is greater than the high threshold, then an excessive transient load on the tool is detected and a "feed hold" is executed in step 242. The "tool protect" condition is displayed to the machine operator in step 243.

A third tool monitor function is the detection of a worn tool. By comparing the cutting efficiency factor of the tool to the initial cutting efficiency factor measured when the tool was sharp and first placed in the turning machine, an unduly worn tool may be detected. As a tool becomes dull, the cutting efficiency factor will increase even if there are programmed or adaptively created changes in SFM or IPR. In contrast, to the detection of excessive transient loads on the tool, the detection of a worn tool should not be responsive to fast fluctuations in the cutting efficiency since a tool which is becoming duller should have a slowly rising cutting efficiency factor. Thus while the tool protect function preferably is repetitively performed at a high rate, the detection of tool wear may be performed at a rather slow rate or preferably is performed at a rather high rate using smoothed or average values which are not responsive to fast, transient changes in the cutting efficiency factor.

As shown in FIG. 13H, the relative cutting efficiency factor CEFR is monitored at the high rate of the 64 millisecond interrupt but comparisons are performed using average values. First, the tool wear switch $G_{tw}$ is sensed in step 250 and if it is on, then the initial relative cutting efficiency sample counter NC is compared to a pre-determined minimum number of samples NS to arrive at a difference representing the number of initial cutting efficiency factor samples that are averaged, and if this difference is greater than or equal to 16, an arbitrary number of samples thought necessary for a suitable average, then a suitable initial relative cutting efficiency factor for a sharp tool $CEFR_{shp}$ is available from the steps generally designated 193 in FIG. 13E.

Returning for a moment to FIG. 13E, the calculation of an initial relative cutting efficiency for a sharp tool $CEFR_{shp}$ is there illustrated. After an initial relative cutting efficiency factor is calculated in step 226, the new tool switch NEWT is tested in step 227 to see if it is on. The new tool switch is one of the switches initially set on in step 103 (FIG. 13A) when the machine is started and it is assumed that the machine is first started with a sharp tool. Since the tool wear function preferably senses an average value, the number of initial horsepower samples NC-NS is computed and compared to 16 in step 228. Note that NS represents the number of initial horsepower samples just after contact of the cutter with the workpiece, as detected in step 188, that must be taken before the machining process has sufficiently stabilized for a computed initial cutting efficiency factor to be meaningful and representative of continious machining. Thus if there are more than 16 samples, the cutting efficiency factor for a sharp tool $CEFR_{shp}$ is set at step 229 to the initial cutting efficiency factor $CEFR_{in}$ which was computed in step 226 from the samples $HP_{cut(i)}$. Also in step 229, the new tool switch NEWT is set off so that subsequent calculations of $CEFR_{in}$ occurring coincident with subsequent soft engagements of the tool do not affect the value of $CEFR_{shp}$, since $CEFR_{shp}$ will be set only once during the initial soft engagement when the new tool switch NEWT is on in step 227.

Returning to FIG. 13H, the tool monitoring subroutine TLMNTR determines if the relative cutting efficiency $CEFR_{shp}$ has been calculated for a sharp tool by comparing the number of samples NC-NS to 16 in step 251. If $CEFR_{shp}$ is not available, the operator is told of this fact in step 252. Otherwise the current average relative cutting efficiency factor AVCFR is calculated by dividing the average cut horsepower $AVHP_{cut}$ by the product of $SFM_o'$ and $IPR_o'$ in step 253. Then the current average relative cutting efficiency factor AVCFR is compared to a high threshold limit somewhat above the initial cutting efficiency $CEFR_{shp}$. Preferably this is done by multiplying the cutting efficiency for a sharp tool $CEFR_{shp}$ by a pre-determined constant $C_{tw}$ with $C_{tw}$ pre-set to a value substantially greater than 1, for example, 1.1. Note that $C_{tw}$ is preferably set less than $C_{max}$, since the average value of CEFR is less than the maximum of the transient values of CEFR. The comparison is performed in step 254 and if the average cutting efficiency factor AVCFR is less than the threshold, the operator is instructed in step 256 that a tool wear feed hold has occurred. This completes the description of the tool monitoring function performed by the subroutine TLMNTR.

| GLOSSARY OF SELECTED SYMBOLS | |
|---|---|
| A | Cross-sectional area of cut = (IPR) (D). |
| $A_p$ | Incremental beginning distance of cutter tip into the workpiece surface during soft engagement before adaptive control is turned on. |
| B | Friction intercept constant for estimating friction of the drive as a linear function of drive velocity. |
| BS | Base speed constant of a DC electric motor. |
| $B_p$ | Incremental ending distance of cutter tip from point where adaptive control is turned off and soft disengagement begins to point where cutter tip breaks out of the workpiece. |
| C | Volume of workpiece material removed by machining. |
| $CEF_r$ | Cutting efficiency factor, defined in terms of machining power required for removal of unit volume of workpiece material. |
| CEFR | Relative cutting efficiency factor defined as the ratio of machining power HP to relative machining rate Q = (IPR) (SFM). |
| D | Depth of cut, defined as the dimension of the cut normal to IPR and SFM. |
| d | Differential operator. |
| $F_c$ | Net feed velocity of the cutter tip. |
| $F_x$ | Feed velocity component in the X direction. |
| $F_z$ | Feed velocity component in the Z direction. |
| HP | Machining power, in general, without limitation as to method of measurement or correction for losses. |
| $HP_a$ | Net machining power loss (+ or −) transferred to the inertial mass of the moving parts of the machine tool assembly and thus associated with net acceleration (+ or −). |
| $HP_c$ | Machining power loss consumed and dissipated as heat in the motor winding circuit of an electrical drive motor. |
| $HP_v$ | Machining power loss due to mechanical friction in the machine tool drive, and excluding friction at the cutter tip. |
| $HP_{cut}$ | Actual machining power dissipated at the cutter tip. |
| I | Electrical drive motor current. |
| Ip | X component of cutter tip displacement vector between successive reads of successive blocks of the part program memory. |
| $I_p$ | Control input to a physical system. |
| IPR | (Inches Per Revolution) dimension of the cut in the direction of the cutting tool feed velocity, for a turning machine, proportional to the feed velocity $F_c$ divided by the rotational drive velocity RPM. |
| $IPR_c$ | IPR commanded by the adaptive control unit. |
| $IPR_{max}$, $IPR_{min}$ | Upper and lower limits on IPR for desired machine tool operation, respectively. |
| $IPR_o$ | control input value to the machine tool, that will tend to result in an equal actual IPR. |
| J | Moment of inertia sensed by the drive. |
| Jp | Z component of cutter tip displacement vector between successive reads of successive blocks of the part program memory. |
| k | Response factor of a feedback control loop. |
| Ms | Friction slope constant for estimating friction of the drive as a linear function of drive velocity. |
| PATH | Distance or magnitude of the resultant cutter tip displacement vector between successive reads of successive blocks of the part program memory. |
| Q | Relative machining rate defined as the product of SFM and IPR. |
| R | Inner machined radius of the workpiece in a turning machine. |
| $R_o$ | Outer machined radius of the workpiece in a turning machine. |
| $R_{av}$ | Average or effective machined radius of the workpiece in a turning machine. |
| $R_c$ | Electrical resistance of the drive motor windings. |
| RPM | (Revolutions Per Minute) Rotational velocity of the drive in a turning machine. |
| $RPM_c$ | Commanded value of RPM. |
| $RPM_m$ | Measured value estimating the actual RPM of the drive. |
| SFM | (Surface Feet Per Minute) Relative transverse velocity of the workpiece surface at and with respect to the cutter edge. |
| $SFM_c$ | SFM commanded by the adaptive control unit. |
| $SFM_m$ | Measured value estimating the actual SFM of the machine tool. |
| $SFM_{max}$, $SFM_{min}$ | Upper and lower limits on SFM for desired machine tool operation, respectively. |
| $SFM_o$ | SFM control input value to the machine tool, that will tend to result in an equal actual SFM. |
| s | Complex frequency parameter denoting frequency domain of the Laplace transform. |
| T | Torque exerted by the drive. |
| t | Time. |
| V | Voltage applied to the drive motor. |
| Vop | Rated voltage of the drive motor. |
| $W_m$ | Measured drive power expressed in watts. |
| w | Angular velocity of the drive. |

What is claimed is:

1. In a machine tool wherein a cutter is driven relatively to the surface of a workpiece to remove a layer of workpiece material, the method of compensating the measured power supplied to the drive means for net power required for net acceleration of the drive means to signal a power value closer to the actual power dissipated at the cutter tip than the measured power supplied to the drive means, said method comprising the steps of:
   (a) determining the value of the net power supplied to the drive means that is required for net acceleration of the drive means, and
   (b) subtracting the value of the net power determined in step (a) from the measured power supplied to the drive means.

2. In a machine tool wherein a cutter is driven relatively to the surface of a workpiece to remove a layer of workpiece material, the method of compensating the measured power supplied to the drive means for the power taken up by frictional losses associated with the drive means to signal a power value closer to the actual power dissipated at the cutter tip than the measured power supplied to the drive means, said method comprising the steps of:
   (a) measuring the velocity of the drive means,
   (b) determining the value of the power taken up by frictional losses associated with the drive means as a predetermined function of the measured velocity of the drive means,
   and
   (c) subtracting the value of the power determined in step (b) from the measured power supplied to the drive means.

3. In a machine tool wherein a cutter is driven by an electrical motor relatively to the surface of a workpiece to remove a layer of workpiece material, the method of compensating the measured power supplied to the motor for the power consumed and dissipated as heat in the resistance of the motor winding circuit of the drive motor to signal a power value closer to the actual power dissipated at the cutter tip than the measured power supplied to the drive motor, said method comprising the steps of:
   (a) determining the electrical resistance of the motor winding circuit of the drive motor;
   (b) determining the value of the power consumed and dissipated as heat in the motor winding circuit of the drive motor as generally proportional to the electrical resistance determined in step (a); and (c) subtracting the value of the power determined in step (b) from the measured power supplied to the drive motor.

4. The method of computing the net power $HP_a$ transferred to the inertial mass of the drive means in a rotary machine tool during a net angular acceleration $dw/dt$ of the drive rotating at an angular velocity w, said method comprising the steps of:

(a) initially determining the moment of inertia J of the drive means, and (b) thereafter during operation of the machine tool computing the net power $HP_a$ transferred to the inertial mass of the drive means as proportional to the product $(J)(w)(dw/dt)$ of the moment of inertia J, the angular velocity w, and the angular acceleration dw/dt.

5. The method of computing the power $HP_v$ taken up by frictional losses associated with the drive in a machine tool, said drive moving at a velocity v, said method comprising the steps of:

(a) initially determining a slope Ms and an intercept B which estimate the power $HP_v$ taken up by frictional losses associated with the drive according to $HP_v = (Ms)(v) + B$, and (b) thereafter during operation of the machine tool computing the power $HP_v$ taken up by frictional losses associated with the drive according to $HP_v = (Ms)(v) + B$.

6. The method of computing the power $HP_e$ consumed and dissipated as heat in the motor winding circuit of an electrical drive motor in a machine tool and determining the power mechanically outputted by the drive motor, said drive motor receiving an electrical current I, said method comprising the steps of:

(a) initially determining the electrical resistance $R_e$ of the motor winding circuit of the drive motor, (b) thereafter during operation of the machine tool computing the power $HP_e$ consumed and dissipated as heat in the motor winding circuit of the drive motor according to $$HP_e \propto (I)(I)(R_e),$$

and (c) using $HP_e$ in determining the power mechanically outputted by the drive motor.

7. The method of signaling the value of power expended at a cutter edge during operation of a machine tool wherein a cutter is driven relatively to the surface of a workpiece to remove a layer of workpiece material, the machine tool having an electrically-powered drive means for producing such relative movement, said method comprising the steps of:

(a) measuring the electrical power $HP_m$ taken up by said drive means, (b) computing the net power $HP_a$ transferred to the inertial mass of the drive means due to net acceleration, (c) computing the power $HP_v$ taken up by frictional losses associated with said drive means, (d) computing the power $HP_e$ consumed and dissipated as heat in the electrical circuit of the drive means, and (e) producing a signal proportional to the difference between (i) said power $HP_m$ and (ii) the sum of the powers $HP_a$, $HP_v$ and $HP_e$, so that said signal is indicative of the power expended at the cutter edge.

8. In machining with a rotary machine tool, the method of determining the actual power expended by the cutting tool and regulating the machining process comprising the steps of:

measuring the power consumed by the rotary drive means in moving the cutting edge relatively transversely across the workpiece surface, subtracting power expended for net angular acceleration of the rotating machine members, and using the difference to regulate the machining process.

9. The method as claimed in claim 8, wherein the net power expended for net angular acceleration is calculated as generally proportional to the torque transmitted by the rotary drive and the angular velocity of the rotary drive, the torque being calculated as proportional to the product of a pre-determined moment of inertia and the angular acceleration of the rotary drive.

10. The method as claimed in claim 9, wherein the calculation of the angular acceleration includes sampling the angular velocity of the rotary drive and calculating the differences in values of adjacent samples.

11. The method as claimed in claim 9, wherein the predetermined moment of inertia is predetermined by a method including the steps of:

operating the rotary drive, with no cutting load, over a range of velocities, measuring the drive power and calculating the moment of inertia as generally proportional to the drive power divided by the product of the angular acceleration and angular velocity of the drive.

12. The method as claimed in claim 11, wherein the drive power is first corrected by subtracting frictional losses of the rotary drive, before determining the moment of inertia.

13. The method as claimed in claim 11, wherein the drive means includes an electric motor, and wherein the drive power is first corrected by subtracting resistive motor losses before determining the moment of inertia.

14. The method as claimed in claim 8, wherein the frictional losses of the rotary drive are also subtracted from the drive power to determine the actual cutting power.

15. The method as claimed in claim 8, wherein the drive means is an electric motor and the measured power is also corrected by subtracting resistive losses of the motor in calculating the actual cutting power.

16. In an automatic control system for a rotary machine tool, the method of determining the actual power expended at the cutting tool and workpiece interface from the measured rotary drive power and regulating the machining process, comprising the steps of:

calculating the expected frictional losses as a predetermined function of angular speed of the rotary drive, subtracting the calculated frictional losses from the measured rotary driver power, and using the difference to regulate the machining process.

17. The method as claimed in claim 16, wherein the predetermined function is a linear function of angular speed.

18. The method as claimed in claim 17, wherein the linear function includes a predetermined slope constant and a predetermined intercept constant.

19. The method as claimed in claim 16, wherein the predetermined function of angular speed is predetermined by an initial procedure comprising the steps of:
driving the machine at a plurality of increments of generally constant angular speeds with no cutting load,
measuring the power consumed by the rotary drive at each of the increments of angular speeds, and
determining the predetermined function from the power measured at the angular speeds by a curve fitting technique.

20. The method as claimed in claim 19 wherein the curve fitting technique is the method of least squares.

21. In an automatic control system for a rotary machine tool having a rotary drive powered by an electric drive motor, the method of determining the actual cutting power expended at the cutting tool and workpiece interface and regulating the machining process comprising the steps of:
measuring the electrical power expended by the drive motor,
correcting for the electrical resistive loss as a predetermined function of velocity, and
using the result to regulate the machining process
wherein the electrical resistive loss is determined by:
(1) calculating the voltage applied to the motor as a predetermined function of angular velocity of the rotary drive, and
(2) calculating the resistive loss as substantially directly proportional to a predetermined constant of resistance, the square of the power expended by the motor, and inversely proportional to the square of the voltage applied to the motor.

22. The method as claimed in claim 21, wherein the voltage is calculated as proportional to angular speed up to a predetermined base speed constant, and equal to a predetermined maximum voltage for angular speeds greater than the predetermined base speed.

23. In a rotary machine tool, the method of initially contacting the workpiece with the cutter at the beginning of a machining operation while avoiding undesirable mechanical stress comprising the steps of;
accelerating the rotary drive, with the cutter disengaged, to achieve a relative transverse velocity of the workpiece surface with respect to the cutter substantially equal to a predetermined maximum velocity at which machining may continuously occur without excessive heating of the cutter so that the machining rate is maximized, and
feeding the cutter into the workpiece at a predetermined minimum feed velocity at which cutting of the workpiece will continuously occur while breaking the shavings into chips so that the machine tool is not clogged with shavings while minimizing excessive force on the cutter.

24. In a rotary machine tool under adaptive control to regulate actual machining power to a set value, the method of disengaging the cutter from the workpiece at the end of a machining operation while avoiding undue attempts at acceleration to maintain constant machining power, said method comprising the steps of:
(a) sensing when the cutter edge is within a preset distance of breaking out of the workpiece, and
(b) thereupon decreasing the feed velocity of the cutter into the workpiece to a predetermined minimum feed velocity at which cutting of the workpiece will continuously occur while breaking shavings into chips so that the machine tool is not clogged with shavings while minimizing excessive force on the cutter, and
(c) thereafter machining while maintaining the relative transverse velocity of the workpiece surface with respect to the cutter at a generally uniform value until the cutter edge breaks out of the workpiece.

25. The method of monitoring the condition of the cutter in a machine toll and regulating the machining process comprising the steps of:
calculating a relative cutting efficiency factor generally proportional to the machining power consumed at the cutting edge and generally inversely proportional to the product of the relative transverse velocity of the cutter with respect to the workpiece surface and the depth of feed of the cutter into the workpiece in the direction of the relative feed velocity generally normal to said relative transverse velocity, and
using the relative cutting efficiency factor to regulate the maching process.

26. The method of determining the condition of the cutter in a rotary machine tool and regulating the machining process comprising the steps of:
calculating a cutting efficiency factor generally proporational to the machining power consumed at the cutter edge and generally inversely proportional to the product of the relative transverse velocity of the cutter with respect to the workpiece surface and the area of the cut approximately normal to the transverse velocity, and
using the cutting efficiency factor to regulate the machining process.

27. The method as claimed in claim 26, wherein the area of the cut is calcuated as generally proportional to
the depth of the cut generally normal to both the transverse velocity of the cutter with respect to the workpiece and the direction of feed of the cutter into the workpice, and
the linear rate of feed of the cutter into the workpiece divided by the angular velocity of the rotary drive of the machine tool.

28. The method of continuously monitoring the condition of the cutter in a numerically controlled rotary machine tool and regulating the machining process comprising the steps of:
repetitively measuring the power expended by the cutting tool in the machining process,
repetitively determining a relative cutting efficiency factor of the cutting tool as generally proportional to the measured power and generally inversely proportional to the product of the relative transverse velocity of the workpiece surface with respect to the cutting tool, and the rate of feed of the cutter into the workpiece per revolution of the machine tool rotary drive,
repetitively comparing the relative cutting efficiency factor to at least one predetermined limit, and
terminating machining process if the cutting efficiency factor is outside the boundary set by at least one predetermined limit.

29. The method as claimed in claim 28, wherein the relative cutting efficiency factor is measured for an initial cut and the predetermined limit is calculated as a predetermined function of the relative cutting efficiency factor for the initial cut.

30. The method as claimed in claim 28, wherein the predetermined limit is time variant, dependent on the location of execution in the part program of the stored program in the numerical control unit.

31. In a rotary machine tool having a DC rotary drive motor responsive to a drive velocity command signal, and having a base speed constant and a maximum torque that is constant for rotational velocities less than the base speed, the method of determining the moment of inertia of the rotary drive as sensed by the drive motor, comprising the steps of:
 (1) setting the drive motor velocity to an initial velocity not greater than the base speed,
 (2) setting the drive velocity command signal to a value commanding a drive motor velocity sufficiently different from the initial velocity so that the drive motor exerts its maximum torque,
 (3) after steps (1) and (2), while the rotational velocity of the driver motor is still sufficiently different from the value commanded by the drive velocity command signal and less than the base speed of the drive motor so that the drive motor still exerts its maximum torque,
  (a) determining the net rotational acceleration of the drive motor,
  (b) determining the rotational velocity of the drive motor, and
  (c) determining the net electrical power delivered to the drive motor for accelerating the drive coincident with the determination of rotational velocity in step (3)(b), and
 (4) after step (3), calculating the moment of inertia as generally proportional to the net electrical power delivered to the drive motor and inversely proportional to both the rotational velocity and the rotational acceleration of the drive motor.

32. The method as claimed in claim 31 wherein the determination of the net electrical power in step (3)(c) includes compensation for electrical resistive loss in the drive motor.

33. The method as claimed in claim 32 wherein the determination of the net electrical power in step (3)(c) includes compensation for drive frictional loss as a function of the rotational velocity determined in step (3)(b).

34. The method as claimed in claim 31 wherein step (1) sets the initial drive velocity to approximately zero and step (2) sets the drive velocity command signal to a value commanding a drive motor velocity exceeding the drive motor's base speed.

35. An automatic control system for a machine tool accepting a desired power signal comprising, in combination,
 means for determining approximately the cutter tip horsepower consumed by the machine drive in moving the cutting relatively at a surface speed transversely across a workpiece surface, generating a cutter tip horsepower signal substantially indicating actual cutter tip horsepower,
 automatic means for comparing the cutter tip horsepower signal to the desired power signal and generating a machining rate control signal responsive to the comparison, and
 machining rate control means accepting a control signal and adjusting the workpiece material removal rate is response to the machining rate control signal, so that the machining power is automatically adjusted in response to desired power by variation of the machining rate.

36. The control system as claimed in claim 35 wherein the machining rate control means comprises a drive control means accepting the control signal and adjusting the surface speed of the drive in response to the machining rate control signal, so that the machining power is automatically adjusted in response to desired power by variation of the drive velocity.

37. The control systems claimed in claim 35 or claim 36 wherein the machining rate control means comprises a cutting tool feed control means accepting the control signal and adjusting the rate at which the cutting tool is fed into the workpiece, so that the machining power is automatically adjusted in response to desired power.

38. The method of computing the power $HP_v$ taken up by frictional losses associated with the drive in a machine tool, said drive moving at a velocity v, said method comprising the steps of:
 (a) initially determining coefficients comprising at least a slope Ms, which estimate the power $HP_v$ taken up by frictional losses associated with the drive according to a polynomial equation in powers of v having at least two terms and comprising at least the term (Ms) (v), and
 (b) thereafter during operation of the machine tool computing the power $HP_v$ taken up by frictional losses associated with the drive by evaluating the polynomial equation for the measured, actual value of the velocity v.

39. An automatic control system for a machine tool accepting a desired power signal comprising, in combination,
 means for determining approximately the cutter tip horsepower consumed by the machine drive in moving the cutter relatively at a surface speed transversely across a workpiece surface, and generating a cutter tip horsepower signal substantially indicating actual cutter tip horsepower,
 automatic means for comparing the cutter tip horsepower signal to the desired power signal and generating a machining rate command signal responsive to the comparison, and
 machining rate control means responsive to said command signal for adjusting the workpiece material removal rate to thereby bring and hold cutter tip horsepower in substantial agreement with said desired power signal.

40. The control system as claimed in claim 39 wherein the machining rate control means comprises a drive control means accepting said command signal and adjusting the surface speed of the drive.

41. The control system as claimed in claim 39 wherein the machining rate control means comprises a cutting tool feed control means accepting said command signal and adjusting the rate at which the cutting tool is fed into the workpiece.

42. The control system as claimed in claim 40 wherein the machining rate control means comprises a cutting tool feed control means accepting said command signal and adjusting the rate at which the cutting tool is fed into the workpiece.

43. The method of producing a signal which is indicative of sharpness of a cutter's edge while the cutter is machining a workpiece in a machine tool, said method comprising
 producing a measured signal representing input power consumed by drive means which create the relative surface motion between the cutter and the workpiece in the machine tool, correcting said measured signal to produce a second signal representing actual cutter tip power, producing a third signal which is proportional to the volumetric rate of removal of material from the workpiece, and producing a tool condition signal which is proportional to the ratio of the second signal to the third signal.

44. The method of operating a machine tool which has a driven member adapted to receive and mount different workpieces of various sizes, shapes and/or weights, said method including the steps, associated with any particular workpiece, of (a) fixing the workpiece to the driven member, (b) driving the member in a fashion such that it and the fixed workpiece are subjected to acceleration, (c) producing a first signal indicative of the power fed in to produce the driving action of step (b), (d) deriving from said first signal a second signal indicative of that portion of the fed-in power devoted to the kinetic acceleration of the driven member with the workpiece fixed thereon, (e) deriving from said second signal a stored representation of the moment of inertia $J$ of the driven member and the workpiece fixed thereon, and (f) utilizing the stored representation in the control of the machine tool during machining operations on the workpiece.

45. The method set out in claim 44 further characterized in that step (f) includes (f1) during machining operations on the workpiece, sensing and determining the total power fed in to produce driving action of said driven member with the workpiece fixed thereon;

(f2) sensing and determining the accelerations or decelerations of the driven member and workpiece, during machining operations on the workpiece, (f3) determining, from the sensed accelerations or decelerations and said stored representation, the value of power transferred as a result of such accelerations or decelerations, and (f4) utilizing said value of transferred power to compensate the determined fed-in power so as to arrive more closely at an indication of the power utilized to produce machining action during machining operations on the workpiece.

* * * * *